219-121 SR
10/22/85 OR 4,549,065

United States Patent [19]

Camacho et al.

[11] Patent Number: 4,549,065
[45] Date of Patent: Oct. 22, 1985

[54] PLASMA GENERATOR AND METHOD

[75] Inventors: Salvador L. Camacho; David P. Camacho, both of Raleigh, N.C.

[73] Assignee: Technology Application Services Corporation, Raleigh, N.C.

[21] Appl. No.: 460,062

[22] Filed: Jan. 21, 1983

[51] Int. Cl.[4] ............ B23K 9/00
[52] U.S. Cl. ............ 219/121 PM; 219/121 PN; 219/121 PR; 219/121 PA; 219/75; 313/231.31
[58] Field of Search ............ 219/121 PM, 121 PP, 219/121 PQ, 121 PN, 76.16, 121 PY, 75; 313/231.3, 231.4, 231.5

[56] References Cited

U.S. PATENT DOCUMENTS

| | | | |
|---|---|---|---|
| 3,194,941 | 7/1965 | Baird . | |
| 3,673,375 | 6/1972 | Camacho . | |
| 3,740,522 | 6/1973 | Muehlberger | 219/121 PN |
| 3,818,174 | 6/1974 | Camacho . | |
| 4,311,897 | 1/1982 | Yerushalmy | 219/121 PR |

OTHER PUBLICATIONS

Plasma Jet Technology, NASA SP-5033, Oct. 1965, 200 pages.

NASA SP-5033, entitled "Plasma Jet Technology" cover sheet.

*Primary Examiner*—M. H. Paschall
*Attorney, Agent, or Firm*—Bell, Seltzer, Park & Gibson

[57] ABSTRACT

A plasma arc torch is disclosed which comprises a rear electrode, an aligned front tubular electrode, and vortex generating means for generating a vortical flow of gas between the rear and front electrodes. The torch further includes an inner shroud which is electrically connected to the front electrode, and an outer shroud which is electrically insulated from both of the electrodes and from the inner shroud. A power supply is operatively connected to the rear electrode and the outer shroud, which is adapted to generate an arc which extends axially from the rear electrode through the vortical flow of gas and through the front electrode, with the front electrode and inner shroud thereby electrically "floating" with respect to the power supply. A water cooling system is also provided which includes a coolant flow path which extends serially from the rear electrode through an insulator to the front electrode, then to the inner shroud, and then through an insulator to the outer shroud.

15 Claims, 77 Drawing Figures

PLASMA GENERATOR AND METHOD

DESCRIPTION

1. Technical Field

This invention relates to plasma arc devices and methods.

2. Background Art

It is believed that sufficient background for understanding the type of plasma generator construction and operation associated with the present invention can be found by making reference to prior art U.S. Pat. Nos. 3,194,941 to Baird, 3,673,375 and 3,818,174 to Camacho and to the publication "Plasma Jet Technology", National Aeronautics and Space Administration publication NASA-5033, published October 1965.

The publication is of interest in providing general plasma technology background and in showing the distinction between transferred and nontransferred modes of operation. The Baird patent is of interest in teaching a transferred arc plasma generator, sometimes referred to as a plasma torch, utilizing a rear electrode, a collimator or so-called nozzle spaced forward of and from the rear electrode, a vortex generator and a shroud structure. The Baird patent teaches a range of collimator length-to-internal-diameter ratios controlling how the plasma generator operates. Recognition is also given to the importance of the inlet velocity to the vortex generator being greater than 0.25 Mach. Of further interest to the present invention is the teaching in the Baird patent of having one inlet and outlet and a coolant path for a coolant fluid to cool the shroud and collimator and another separate inlet and outlet and another coolant path for a coolant to cool the rear electrode. The Baird patent also describes how erosion of the rear electrode relates to whether an AC or DC source is used as the power source. In this regard, the Baird patent also discusses how such erosion can be spread over a large surface area within the rear electrode by using either an AC source as the power source for operating the plasma generator or by supplementing the power source with an externally applied rotating magnetic field to rotate and spread out the point of attachment of the arc within the rear electrode to distribute the erosion wear. Noticeably, the Baird patent does not deal with how and whether the outer shroud is grounded.

The earlier Camacho U.S. Pat. No. 3,673,375, like the Baird patent, relates to a generally tubular transferred arc-type plasma generator. However, as an improvement over the teachings of the Baird patent, the earlier Camacho patent taught that the spacing between the collimator and rear electrode, as distinct from the relation of the length to the internal diameter of the collimator, was also of controlling importance within a designated range in order to be able to obtain a relatively long and stable transferred arc not obtainable with the Baird generator. In the earlier Camacho patent, there is also taught the concept of cooling the rear electrode with air and the collimator with water. The rear electrode is illustrated as being formed of a copper tube mounted within a stainless steel tube. Use of an AC power supply and the possibility of being able to operate the generator in either a nontransferred or transferred mode are mentioned in the earlier Camacho patent. The collimator and outer shroud are also shown mechanically connected and thus would necessarily operate at the same electrical potential.

In the later Camacho U.S. Pat. No. 3,818,174 attention is specially given to preventing the double arcing situation. Attention is also given to the manner and importance of electrical grounding of the outer shroud. Separate cooling systems for the outer shroud, the rear electrode and the collimator are provided. A tube is illustrated as the rear electrode. The advantage of accelerating the cooling fluid in a path around a portion of the rear electrode which receives the most heat is also mentioned. However, the electrical characteristics of this path in relation to other cooling paths is not discussed.

In another aspect of the prior art, it has been known that the arc has less tendency to attach to a cool surface than to a hot surface. Thus, it can be concluded from all of the foregoing mentioned prior art references that how the plasma generator is cooled and the efficiency with which it is cooled is of critical and extreme importance. Furthermore, it can be concluded from the aforementioned references that any savings in quantity of water consumed in cooling is significant. The mentioned references also indicate why electrical grounding is important both for overcoming the double arc and "kish" problem discussed in the later Camacho U.S. Pat. No. 3,818,174 as well as for operator safety and proper functioning of the plasma generator.

Another conclusion that can be drawn is that any cooling system which brings the cooling fluid in actual contact with an electrode may establish an electrical path through the cooling fluid, typically water, back to the source, typically a metal pipe serving as the water main or to a metal pipe serving as a waste or sewer discharge. Further, it can also be seen that any cooling system which brings the cooling fluid in contact with both the rear electrode and the collimator also tends to establish a short circuiting and potentially damaging electrical path between these two operating metal components of the plasma generator. Thus, the typical approach for cooling the rear electrode, the collimator and the shroud has been to establish one cooling circuit for the electrode and one or more separate cooling circuits for the collimator and shroud. So far as applicants are aware, it has not heretofore been known to provide a cooling system in which the same cooling fluid has been used to cool the rear electrode, the collimator, and a shroud in sequence with the electrical insulation through the water being achieved by the use of controlled water path lengths housed by electrically nonconducting material, e.g., a nonconducting hose, between the separate cooling circuits and between such circuits and the incoming water main line. The achieving of an improved cooling system in which the rear electrode, the collimator, an inner shroud and an outer shroud are all cooled by the same fluid in sequence becomes one of the objects of the invention.

The cited prior art references also lead to the conclusion that even though certain plasma arc generators have been indicated to be adaptable to either transferred or nontransferred modes of operation, such generators are usually designed for and work best in either one mode or the other. Thus, it would be an advantage to provide a plasma arc generator in which a collimator primarily designed for a transferred mode of operation could be readily interchanged with a front electrode member designed so as to be useful either as an electrode or collimator for either a sustained nontransferred mode of operation or a sustained relatively long transferred arc operation even though not necessarily optimally operable in either mode. Melting of electrically nonconducting materials (e.g., refractories: phosphates, silicates, aluminates, etc.) residing in a furnace having a grounded conducting floor, e.g., graphite or cast iron, represents one application for such a generator in which the melting could be initiated in a nontransferred mode and then continued in a transferred mode by attachment of the arc to the electrically-conducting, molten refractory which is in contact with the furnace floor.

As a related aspect, it has been known to form the rear electrode in what could be realistically referred to as a deep cup shape. However, the typical front electrode for a nontransferred arc generator has a tubular bore of uniform diameter and the frontal area of this bore is rapidly eroded. Thus, another object of the invention becomes that of providing an improved plasma generator, i.e., a "hybrid" generator, which lends itself to being operable in either mode on a sustained basis and in which the front electrode is so designed as to control the erosion wear in the frontal area.

Another conclusion to be drawn from the referenced prior art is the advantage of distributing the rear electrode erosion wear over a large surface within the rear electrode as distinct from allowing the arc to attach to and wear a single point or to wear along a single closed circular path within the rear electrode. It is known that gas pressure affects where the arc tends to attach and it has been known to manually regulate a valve to vary the axial point of attachment. The prior art references referred to recognize the inherent value of using an AC power source as distinct from a DC power source as a means for achieving erosion over a relatively wide surface area and also recognize using a magnetic field to rotate the arc for this purpose. However, use of a DC power source for the plasma generator also has known advantages and it would be desirable to provide a plasma generator that could be operated using either an AC or a rectified AC-DC power source but when operated on DC would have means for distributing the erosion wear dependent on controlling the gas pressure rather than using electric means for this purpose. The achieving of an improved plasma generator construction and method centered around operating the improved generator of the invention with programmed gas pressure control to distribute optimally the electrode erosion becomes another object of the invention.

In a still further aspect of the prior art as relates to the type of tubular plasma generator embodied in the invention, the fluid-cooled shroud which mounts around the rear electrode and collimator has not itself, so far as is known, been mounted in another outer fluid-cooled and electrically-grounded shroud electrically insulated from the inner shroud which mounts the collimator. Thus, where the collimator is mechanically connected to and supported by a single metal shroud, the collimator cannot electrically float with respect to such shroud. The drawing in the Baird patent as well as FIG. 1 of the earlier Camacho U.S. Pat. No. 3,673,375 illustrates this configuration. FIG. 5 of the later Camacho U.S. Pat. No. 3,818,174 shows a still further configuration in which the collimator is supported by a fluid-cooled shroud which is electrically insulated from the collimator in front and from another fluid-cooled and electrically-ground shroud to the rear. Thus, in this last-mentioned configuration, both the collimator and the front shroud electrically float. The achieving of a surrounding outer fluid-cooled shroud which is both electrically grounded and electrically insulated from an inner fluid-cooled shroud that is mechanically and electrically connected to the collimator such that the inner shroud can electrically float with the collimator but can be used in the start circuit becomes another object of the invention.

In another aspect of the invention to be noted, it is known that the collimator is exposed to extreme heat conditions. Therefore, any electrical insulation which contacts the collimator is also necessarily subjected to extreme heat and is therefore subject to both dimensional changes and, to some extent, a creeping effect after a period of break-in service. Such insulation may also be in contact with a fluid-cooling path and thus, the introduction of fluid leaks can be expected when the mating insulation and other surfaces, such as heated collimator surfaces, are not in close contact. A further object of the present invention thus becomes that of providing means for being able to mechanically reposition certain insulation surfaces associated with water paths to overcome this problem and also to maintain gap width.

A more general object of the invention becomes that of providing an overall improved cooling system insulation arrangement, electrical configuration, inner-outer fluid-cooled shroud arrangement so as to improve both transferred and nontransferred type modes of operation but particularly the transferred type. As part of such overall improvement, it is also the object to substantially extend the wear life of both the rear electrode and the collimator such that insofar as is practical both the rear electrode and the collimator will have substantially equal life sufficient to justify replacement of both at the same time as necessary rather than having to replace them at different times during maintenance procedures.

DISCLOSURE OF THE INVENTION

The invention provides a plasma generator made up of an outer assembly and an inner assembly. The inner assembly is itself an essentially complete plasma generator and the outer assembly provides a fluid-cooled mounting assembly which is electrically insulated from the inner assembly. A uniquely hydraulically and electrically designed fluid-cooling system allows the same cooling fluid to cool the rear electrode, the collimator, the inner shroud and an outer shroud. Conversion from a transferred mode type generator to a hybrid mode type generator adapted to operate in either a transferred or nontransferred mode is achieved in an alternative embodiment. For this purpose, a fluid-cooled front electrode operable in both the transferred mode and nontransferred mode is made interchangeable with the collimator designed primarily for the transferred mode. Unique dimensions of length and inner diameter and a unique frontal cup-shape are achieved in the electrode adapted to both modes of operation and with reduced erosion of the frontal area of the front electrode when operated, particularly in the nontransferred mode.

The gas pressure in a further alternative embodiment is program regulated to cause the arc attachment in the improved plasma generator of the invention to be spread over a relatively wide area within the rear electrode and thereby in conjunction with the improved cooling system substantially reduce rear electrode erosion when operated on a DC power source so as to make the anticipated life of the collimator and rear electrode between replacements both longer and more nearly equal. The improved plasma generator of the invention also utilizes a major insulation piece which bears against the collimator and which in addition to serving as an electrical insulator also serves as both a fluid and gas conduit device. Means are provided for mechanically adjusting this insulation piece to accommodate for wear, mechanical creep, and the like, and thereby avoid leakage between the contacting surfaces of the collimator and such insulation piece and maintain gap width.

Advantage is taken of utilizing the teachings of the mentioned Camacho patents in conjunction with the improved construction with respect to the relation of the collimator inside diameter and length and the spacing of the collimator from the rear electrode establishing the vortex chamber. In addition, other electrical and hydraulic characteristics are introduced in the cooling system to avoid undesired electrical circuits or flow conditions being established even though in the cooling system of the invention there is a continuous fluid path in electrical contact with the rear electrode, the collimator, the inner shroud and the outer shroud.

BEST MODE FOR CARRYING OUT THE INVENTION

A plasma generator 50 made according to the first embodiment of the invention as illustrated in FIGS. 1–30 incorporates three basic systems, namely, a gas system, an electrical system and a cooling system and physical structure is provided for each system. The plasma generator 50 can furthermore be broken down into an inner subassembly 55 shown in an exploded view in FIG. 3 and an outer subassembly 60 shown in an exploded view in FIG. 6 and which receives the inner subassembly 55 to complete the plasma generator 50. The description will next proceed to describing those components making up the inner subassembly 55, will then proceed to describing the components making up the outer subassembly 60 and thereafter will deal with the improved operation, particularly in reference to FIGS. 66–70. Thereafter, the description will make reference to FIGS. 73–77 and to an alternative embodiment providing a "hybrid" type of plasma generator adapted to operating in either a transferred mode or a nontransferred mode under certain limitations as will be described.

Figure 1:
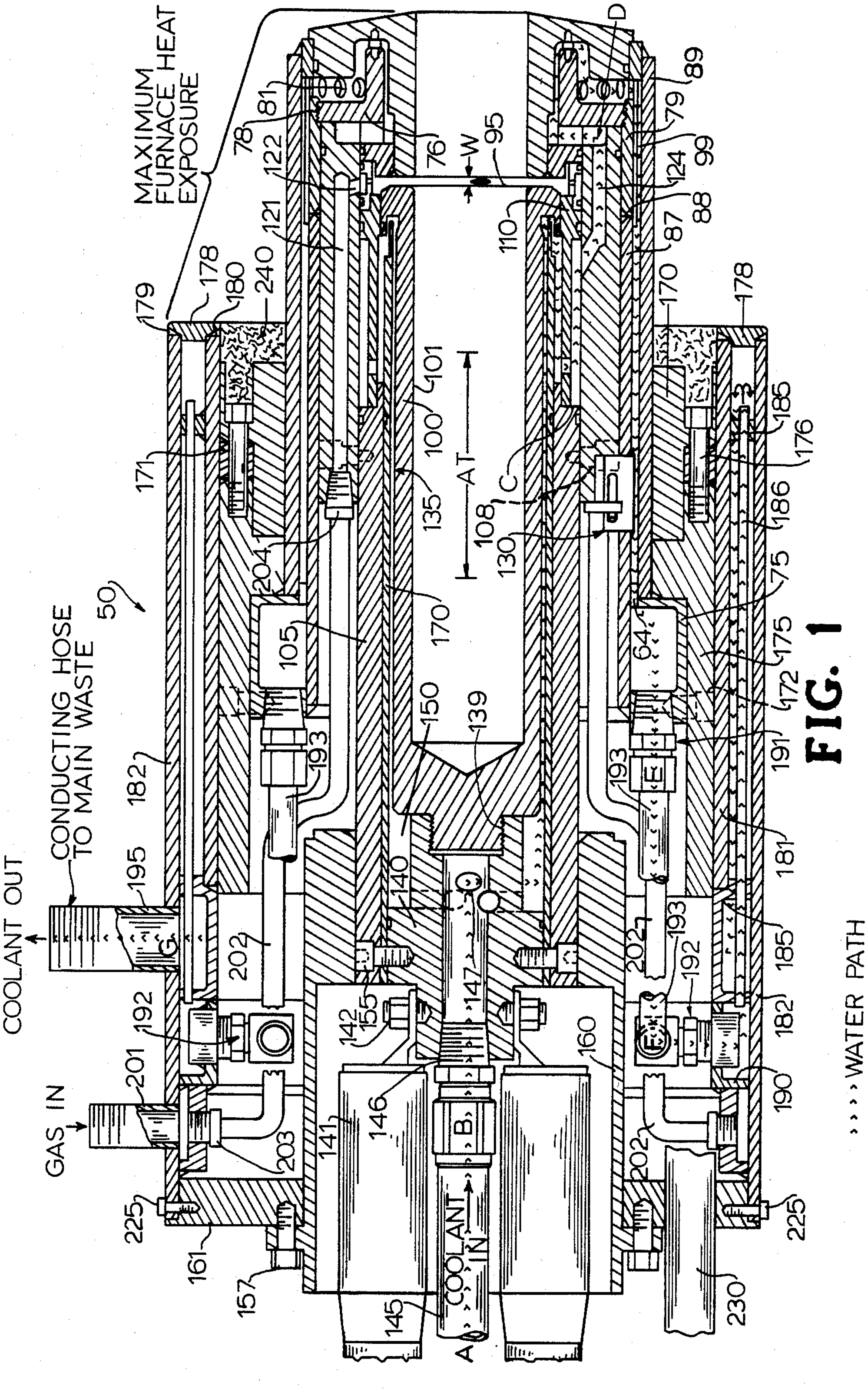
FIG. 1 is a partially schematic offset section view taken through a plasma generator made according to the invention.
Figure 70:
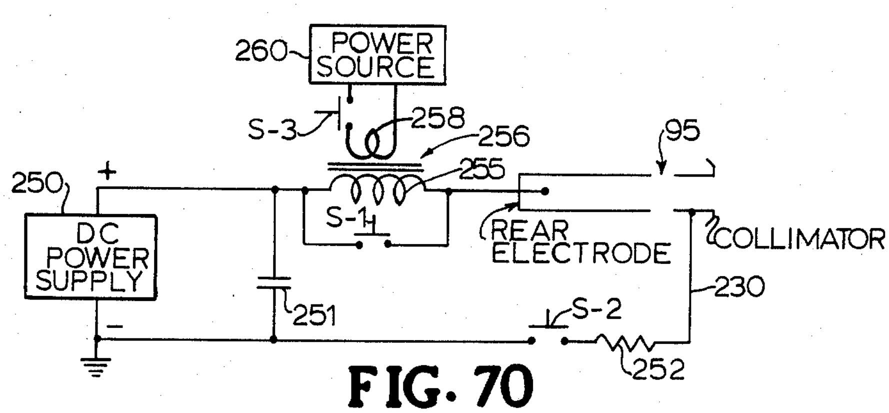
FIG. 70 is a schematic diagram of a starting circuit used with the invention.

With further reference to FIGS. 1–70, the collimator assembly 70 (FIGS. 3 and 15) is made up of a collimator 71 (FIGS. 9–11) joined to a collimator support collar 72 (FIGS. 12–14) by means of pins 73 (FIG. 15) with the dimensions L and D (FIG. 10) being selected according to the teachings of the previously referred to Camacho U.S. Pat. No. 3,673,375. The collimator support collar 72 which also serves as a collimator water guide has a flange 76 with threads 77 adapting the collimator assembly 70 to be threadably secured within the threads 78 of the front ring member 79 (FIGS. 1, 3, 5 and 45–47) forming part of an inner fluid-cooled shroud assembly as later discussed in more detail.

Figure 10:
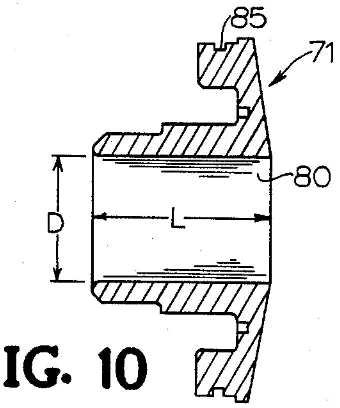
FIG. 10 is a section view taken along line 10—10 of FIG. 9.

A portion of the unique cooling system and method of cooling associated with the invention is established within the collimator assembly 70. In this regard, it will be appreciated that the internal surface 80 indicated in FIG. 10 is exposed to extreme heat and therefore must be cooled, both to inhibit erosion of surface 80 as well as inhibit the tendency of the arc to attach to a hot surface. Collimator support collar 72 is thus also designed to act as a collimator water guide. A plurality of holes 81 (FIGS. 1 and 13) in collimator collar support 72 mate with other fluid passage holes 84 in front ring 79 (FIGS. 3 and 47) and allow the cooling fluid, indicated by arrows in FIGS. 13 and 15, to enter and then accelerate at a substantially high velocity within the narrow annular passage 82 (FIG. 15) following which the heated water is discharged through the annular chamber 83 as further illustrated in FIG. 15.

Figure 13:
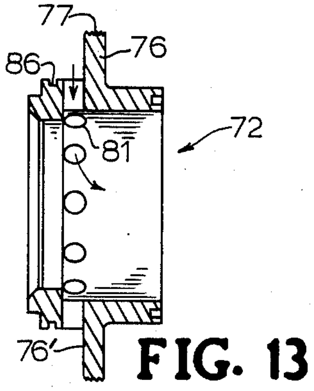
FIG. 13 is a section view taken along line 13—13 of FIG. 12.
Figure 11:
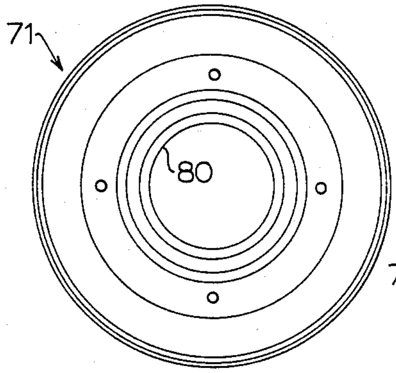
FIG. 11 is a rear view of the collimator.
Figure 15:
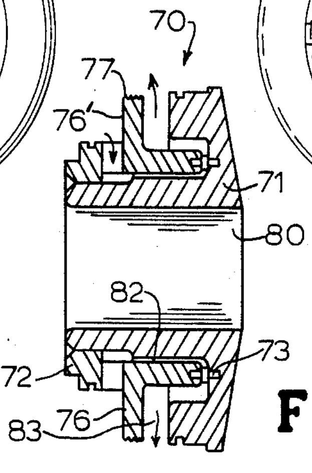
FIG. 15 is a section view illustrating the assembly of the collimator shown in FIG. 10 with the collimator support collar and water guide shown in FIG. 13.
Figure 14:
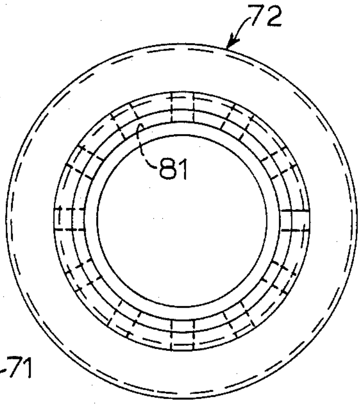
FIG. 14 is a rear view of the collimator support collar and collimator water guide.
Figure 16:
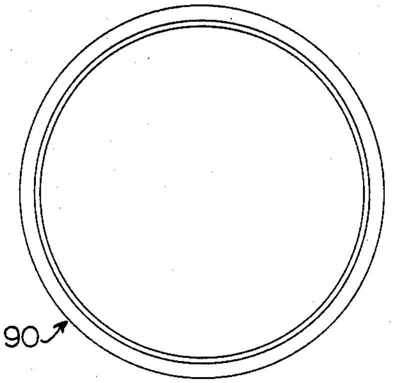
FIG. 16 is a rear view of the vortex generator.
Figure 17:
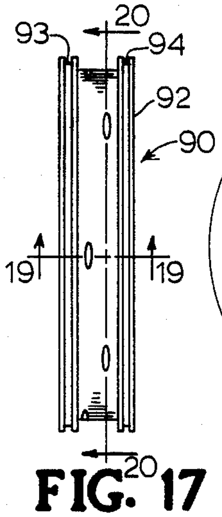
FIG. 17 is a side elevation view of the vortex generator.
Figure 18:
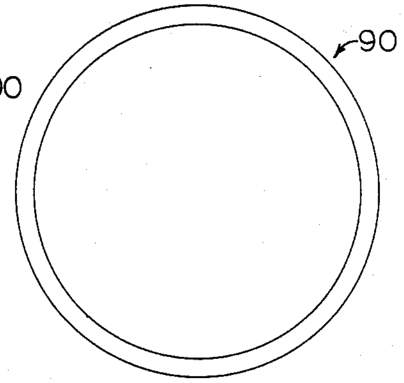
FIG. 18 is a front view of the vortex generator.
Figure 19:
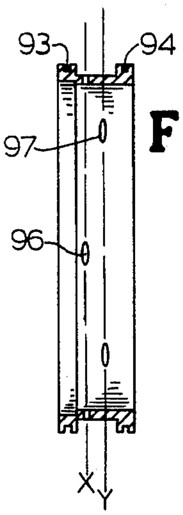
FIG. 19 is a section view taken along line 19—19 of FIG. 17.
Figure 20:
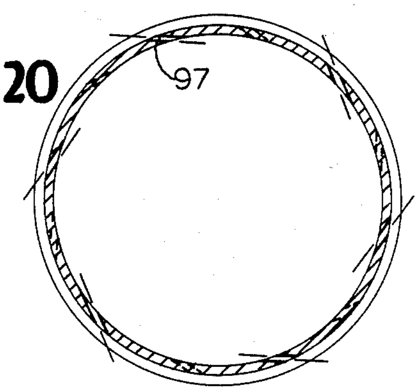
FIG. 20 is a section view taken along line 20—20 of FIG. 17.
Figure 22:
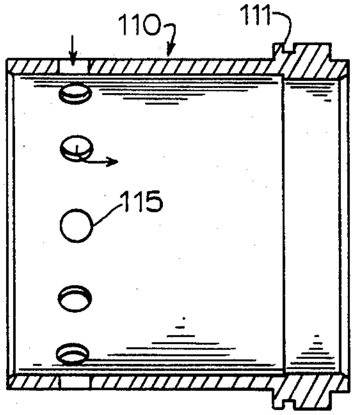
FIG. 22 is a section view of the front cup insulator taken along line 22—22 of FIG. 23.
Figure 21:
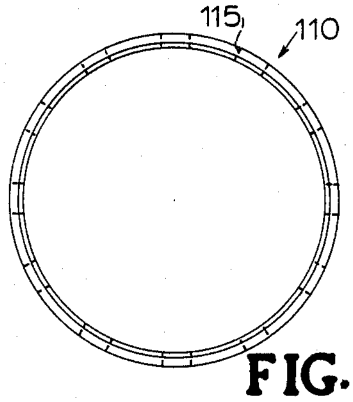
FIG. 21 is a rear view of the front cup insulator.
Figure 23:
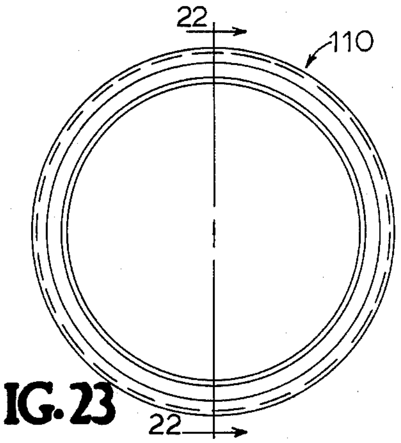
FIG. 23 is a front view of the front cup insulator.
Figure 26:
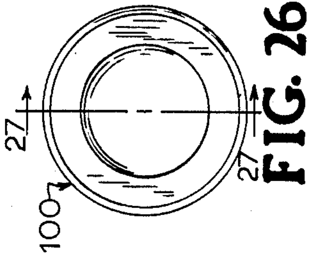
FIG. 26 is a front end view of the rear electrode.
Figure 28:
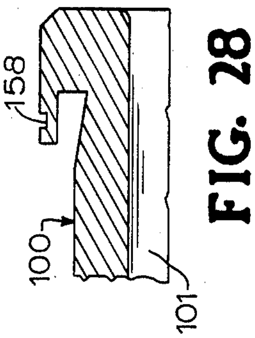
FIG. 28 is an enlarged detail of the rear electrode front edge construction.
Figure 24:
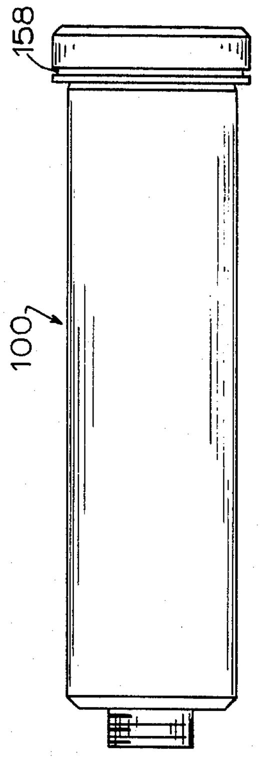
FIG. 24 is a side elevation view of the rear electrode.
Figure 27:
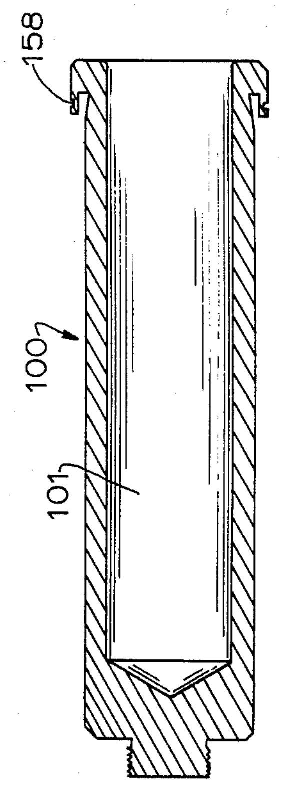
FIG. 27 is a section view taken along line 27—27 of FIG. 26.
Figure 25:
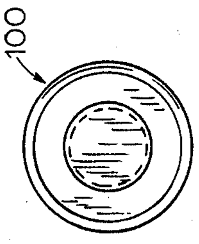
FIG. 25 is a rear end view of the rear electrode.

An important aspect of plasma generator operation is to prevent leaks of the coolant fluid, typically water, particularly into the plasma generator or other areas where electrical short circuit conditions might be established. Thus, O-ring seals are employed to prevent such leaks with O-ring seats 85, 86 shown in FIGS. 10 and 13 representing two such O-ring seal locations.

Figure 39:
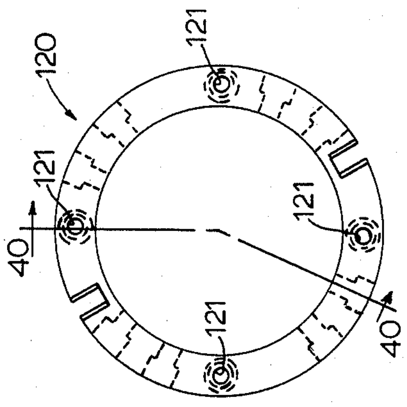
FIG. 39 is a rear view of a cylindrical insulator referred to as the collimator insulator.
Figure 36:
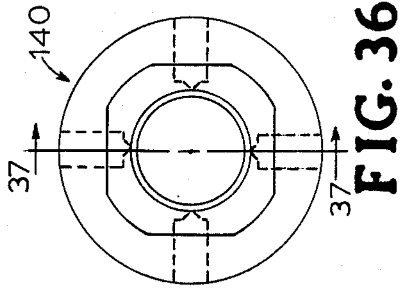
FIG. 36 is a rear view of the rear electrode holder.
Figure 43:
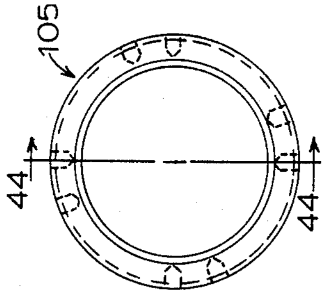
FIG. 43 is a front end view of the rear insulator sleeve.
Figure 44:
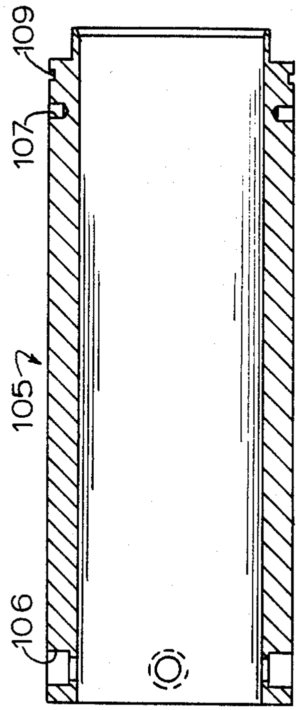
FIG. 44 is a section view taken along 44—44 of FIG. 43.
Figure 42:
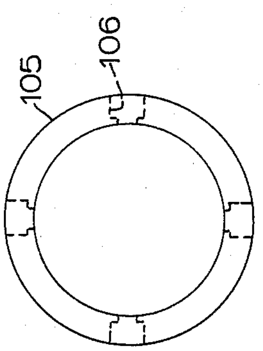
FIG. 42 is a rear end view of the rear insulator sleeve.
Figure 46:
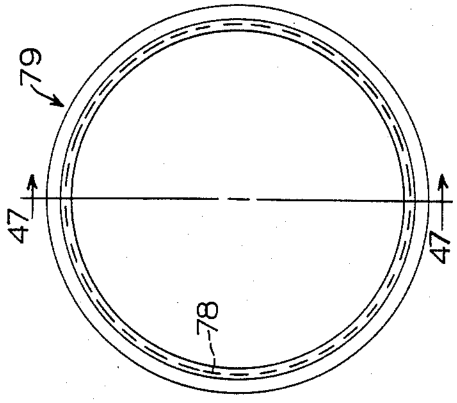
FIG. 46 is a front end view of the front ring.
Figure 47:
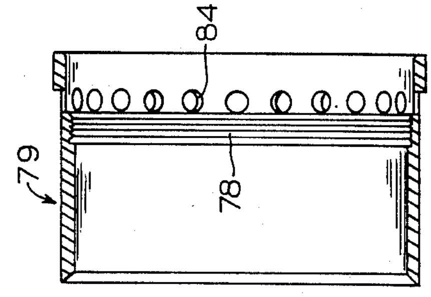
FIG. 47 is a section view taken along line 47—47 of FIG. 46.

With continuing reference to the inner subassembly 55, various views of the vortex generator 90 are shown in FIGS. 16–20. Vortex generator 90 is mounted within the later-described collimator insulator 120 (FIGS. 1, 3, 5 and 39–41) and includes a pair of double rim formations 91, 92 sealed by means of O-rings in seats 93, 94. The rim formations 91, 92 are seated within the collimator insulator 120 so as to mate the gas passages 121 (FIGS. 1 and 39–40) with the annular manifold formed by collimator insulator 120 between the rib members 91, 92. Four such gas passages 121 are illustrated in FIG. 39. The gas is introduced in the gap 95 (FIG. 1) between the collimator assembly 70 and the rear electrode 100 with the width W of the gap 95 being selected to conform with the teachings of the Camacho U.S. Pat. No. 3,673,375. To enhance the swirling vortex action, one set of angled discharge apertures 96 are formed in one plane designated X in FIG. 19 whereas another set of angled apertures 97 are formed in an axially-spaced plane designated Y in FIG. 19. The gas discharge apertures in the planes X and Y are equally spaced around vortex generator 90.

A front insulator cup 110 (FIGS. 3 and 21–23) mounts against the rear surface 98 (FIG. 3) of vortex generator 90 and is mounted so as to surround the front of rear electrode 100 (FIGS. 1, 3 and 24–28). Rear electrode 100 is formed as an integral piece of copper in a relatively thick wall, deep cup shape. Front cup 110 in turn mounts within the previously referred to collimator insulator 120 (FIGS. 3 and 39–41) with a sealing relation being established by an O-ring in seat 111. As will be later referred to, the front insulator cup 110 includes a plurality of holes 115 through which the cooling fluid is admitted after being heated by rear electrode 100 and is discharged as indicated by the arrows in FIG. 22 and later described in more detail in connection with describing the continuous flow path associated with the unique cooling system of the invention and as diagrammed by the line of arrow marks labeled "water path" in FIG. 1.

Figures 3, 4, 5:
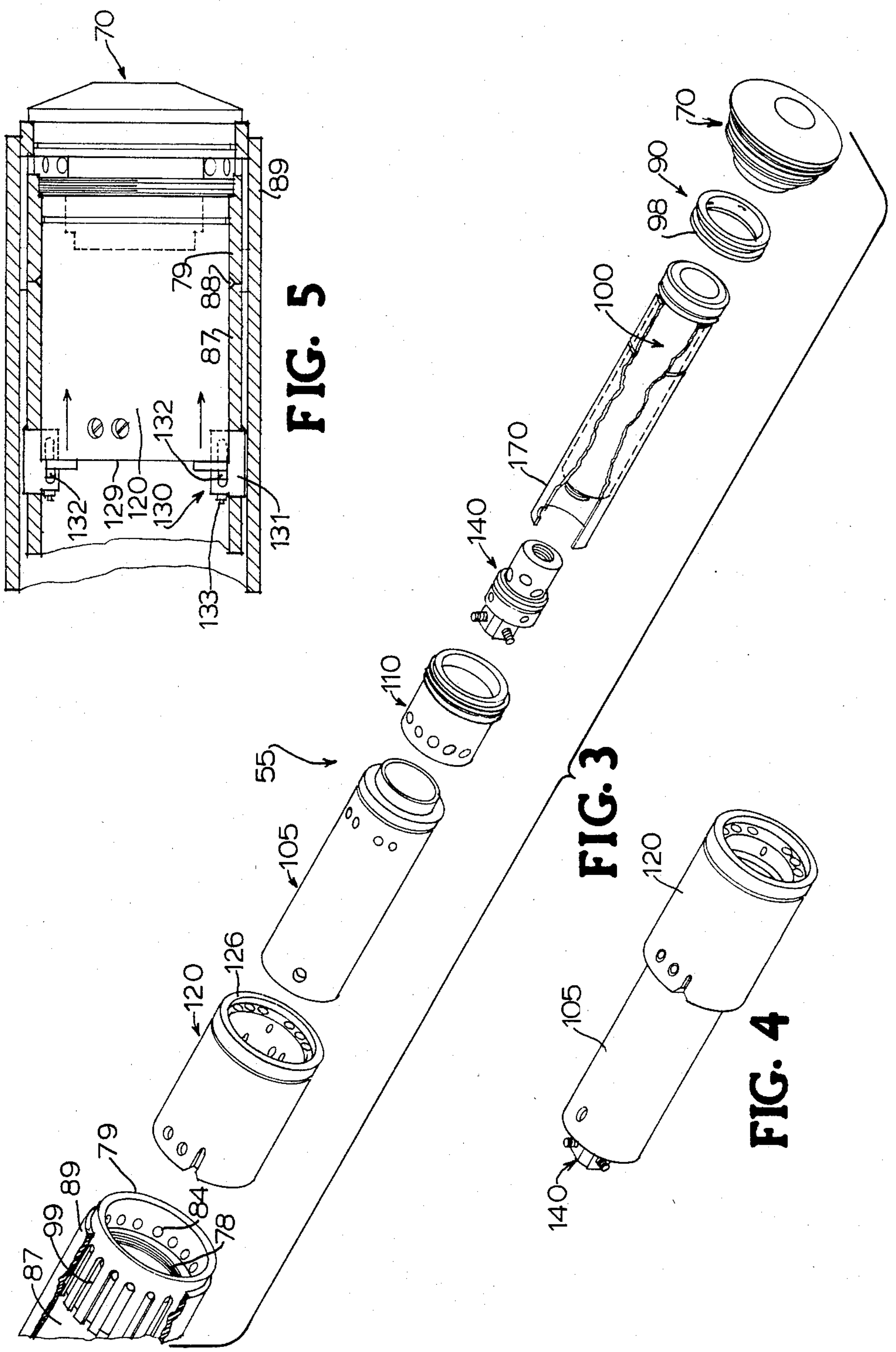
FIG. 3 is an exploded view of the inner subassembly for the plasma generator shown in FIG. 1.
FIG. 4 is a perspective view of the electrode holder subassembly forming part of the inner subassembly.
FIG. 5 is a partial section view illustrating the collimator insulator adjusting mechanism.
Figure 40:
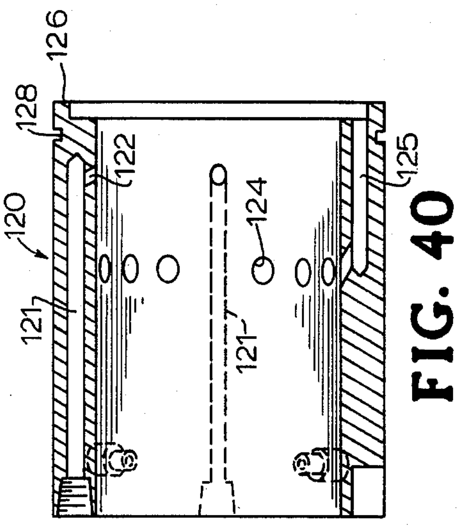
FIG. 40 is a section view taken along line 40—40 of FIG. 39.
Figure 37:
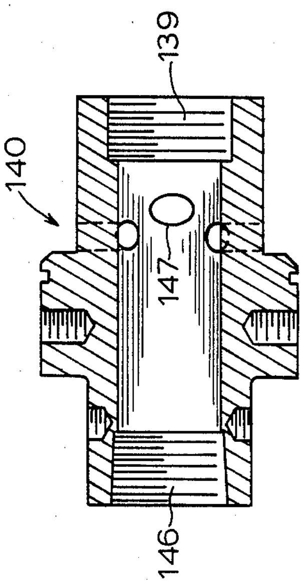
FIG. 37 is a section view taken along line 37—37 of FIG. 36.
Figure 48:
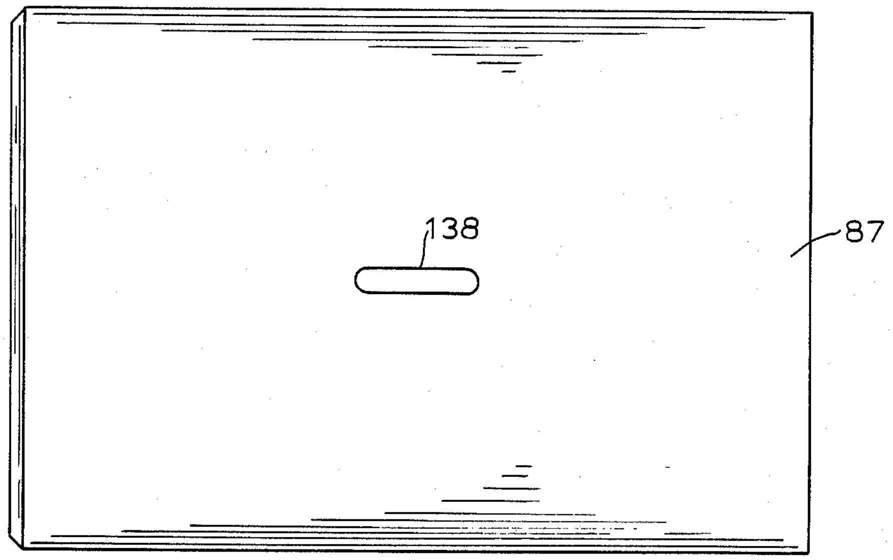
FIG. 48 is a side elevation view of the innermost shroud.

The previously referred to collimator insulator 120 serves a number of functions. One function is that of establishing insulation between the rear electrode 100 and an inner fluid-cooled shroud assembly having an inner shell formed by ring member 79 which is aligned with and welded to inner shroud 87 (FIGS. 1, 5 and 48) by weld 88 and an outer shell formed by outer shroud 89. Water flows, as later described, from the collimator assembly 70 through milled slots 99, best seen in FIG. 3, in front ring 79 and to a collecting water manifold 75 (FIGS. 1 and 59–61). Another function of collimator 120 is to provide passages 121 for admission of the gas to the previously-mentioned vortex generator 90. A still further function is that of providing a portion of the water path utilizing holes 124 and passages 125 as best seen in FIG. 40. As seen in FIG. 1 and somewhat schematically illustrated in FIG. 5, it will be noted that the front surface 126 (FIGS. 3 and 40) of the collimator insulator 120 bears against flange surface 76′ (FIG. 13) of the collimator support collar 72. Since the collimator insulator 120 is inherently subjected to extreme heat, there is an inherent tendency for leaks to develop between the mentioned contacting surface 76′ of the collimator support collar 72 and the surface 126 of the collimator insulator 120. Thus, provision is made for adjusting the pressure applied by the collimator insulator 120 against flange 76 of the collimator support collar 72 by means of the adjustment mechanism 130 (FIGS. 1 and 5). Adjustment mechanism 130 includes a fixed support member 131 mounted in slot 138 (FIG. 48) of inner shroud 87 and welded thereto, a threaded block 132 and a screw member 133. Thus, by adjusting screw 133, the block member 132 can be forced against the back surface 129 (FIG. 5) of the collimator insulator 120 so as to bring the respective surfaces 126 (FIG. 3) and 76′ (FIG. 15) in more forceful contact to avoid the mentioned leakage problem and to control gap width. Additional sealing is provided by an O-ring in seat 128 (FIG. 40).

Rear electrode 100 is threadably secured and supported in threads 139 in the metal electrode holder 140 illustrated in FIGS. 1, 3, and 36–38. Electrode holder 140, in addition to serving as a means for holding the rear electrode 100, also serves as a means for connecting an appropriate number of power cables 141 by means of the fasteners 142, illustrated in FIG. 1, to deliver electric power from an external power source to the rear electrode. Electrode holder 140 also serves a further function in acting as a fluid conduit. The incoming coolant fluid, typically pressurized water, is fed through a flexible, electrically nonconducting hose 145 through a threaded inlet 146 in electrode holder 140 and is then discharged in a swirling pattern through a plurality of angled holes 147 (FIGS. 37–38) into an annular cavity 150 surrounding the forward portion of electrode holder 140 and spaced radially outwardly from the threaded receptacle 139 into which the rear electrode 100 is threadably secured. Electrode holder 140 is thus itself cooled by the coolant prior to the same coolant being used to cool rear electrode 100.

Figure 30:
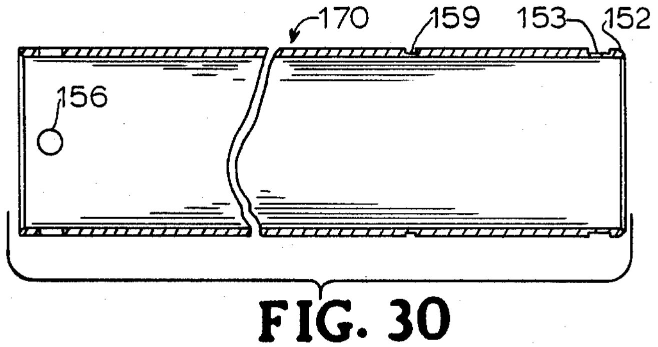
FIG. 30 is a section view taken along line 30—30 of FIG. 29.
Figure 32:
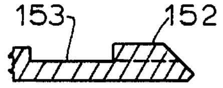
FIG. 32 is an enlarged detail section view of the detail indicated in FIG. 30.
Figure 33:
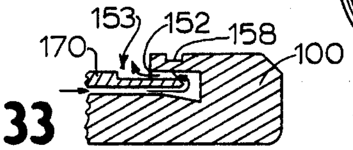
FIG. 33 is a detail combining the details of FIGS. 28 and 32.
Figure 31:
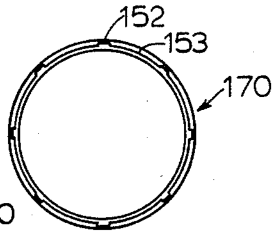
FIG. 31 is a front view of the water guide.
Figure 41:
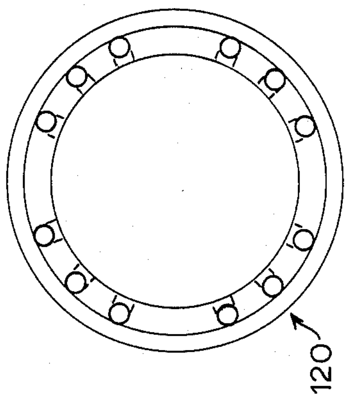
FIG. 41 is a front view of the collimator insulator.
Figure 38:
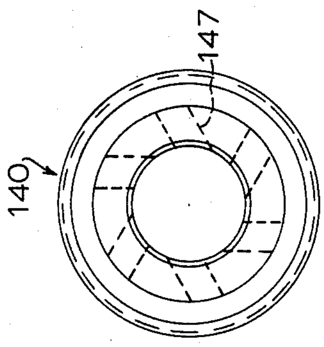
FIG. 38 is a front view of the rear electrode holder.

The pressurized water, typically at a pressure of 200–300 psig is fed between the rear electrode 100 and a metal water guide 170 (FIGS. 1 and 29–33) which is secured to electrode holder 140 by means of the bolts 155 passing through holes 156 seen in FIGS. 1 and 30. Water guide 170 is formed as a highly precision made, noncorroding metal tube so as to provide a greatly restricted flow path such that the coolant fluid will flow at high velocity between the outer surface of rear electrode 100 and the inner surface of water guide 170, this restricted path being indicated by the numeral 135 in FIG. 1. The forward edge portion of water guide 170 is specially shaped as illustrated in the enlarged detail (FIG. 28) so as to provide peripherally-spaced tabs 152 adjacent an annular recess 153, the purposes of which are later explained. In general, it can be said that the coolant fluid is caused to accelerate for substantially the entire length of the rear electrode so as to achieve a relatively high velocity in the constricted passage 175. The elevated pressure of the coolant fluid also acts to prevent nucleate boiling of the fluid. This arrangement also ensures maximum heat transfer to the coolant fluid so as to maintain the inner surface 101 (FIG. 1) within rear electrode 100 as cool as is practical. However, it should be appreciated that the coolant fluid in passing through the constricted passage 135 is in actual contact with the rear electrode 100 and therefore tends to assume the same voltage as that of rear electrode 100. Additional sealing is provided by O-rings in seat 158 (FIG. 28) and seat 159 (FIG. 30). The manner in which the hydraulics of the flow path and this electrical condition is accounted for in the overall cooling system so as to avoid undesired voltages and currents in the cooling system is later described.

Figure 45:
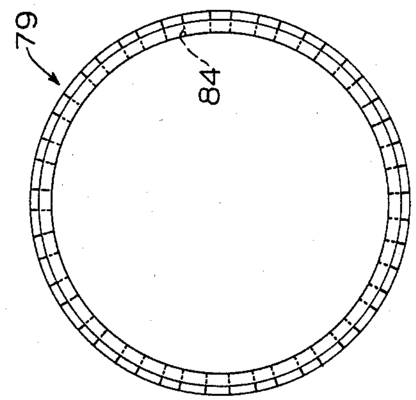
FIG. 45 is a rear end view of the front ring.

An insulator sleeve 105 (FIGS. 1, 3 and 42–43) has bolt holes 106 and is secured by bolts 155 to electrode holder 140 (FIG. 1). Insulator sleeve 105 acts as a continuation of the insulation provided by the previously-mentioned insulation cup member 110. Other holes 107 (FIG. 45) receive other securing bolts 108 (FIG. 1) and additional sealing is provided by an O-ring in seat 109 (FIG. 45). The basic description of the inner subassembly 55 now having been completed, the description next turns to the outer subassembly 60 shown in FIG. 6 which receives the inner subassembly 55 shown in FIG. 3.

Figure 2:
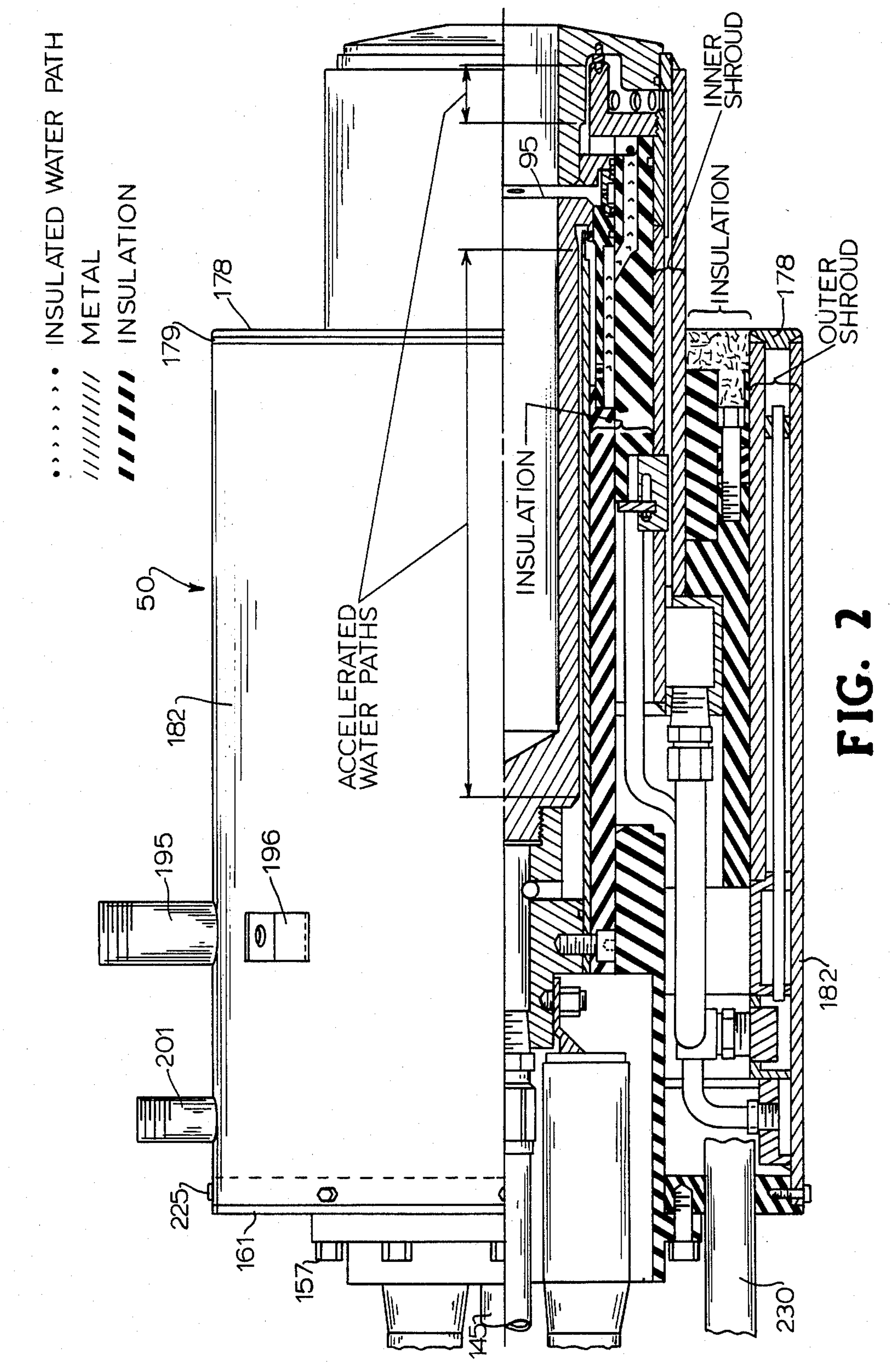
FIG. 2 is a partial section view of the plasma generator shown in FIG. 1.

As will be apparent from the description, the inner subassembly 55 when connected to appropriate power, gas and coolant supplies is essentially a complete plasma generator having a fluid-cooled rear electrode and a fluid-cooled collimator contained within a fluid-cooled shroud and with the rear electrode, collimator and shroud all being cooled by the same cooling fluid at a high rate of heat transfer and without establishing damaging electrical short circuit conditions or undesirable hydraulic conditions in the coolant flow path. The following description now illustrates how the outer subassembly 60 is built up to provide an additional fluid-cooled shroud concentric with, insulated from, and surrounding the rearward portion of the first-mentioned fluid-cooled shroud so as to allow the forward portion of the inner subassembly 55 and its fluid-cooled shroud to protrude outwardly from the outer subassembly and its separate fluid-cooled shroud. Thus, two concentric fluid-cooled metal shrouds insulated from each other as best illustrated by FIG. 2 surround substantially the entire length of the arc attachment area, designated AT in FIG. 1, with minimum shroud area being exposed to the hottest area of the furnace. The axial length of area AT is related to the inner diameter of rear electrode 100 and generally should not extend closer than a distance equal to about two diameters from either the rear or front ends of the electrode.

Figures 6, 7, 8:
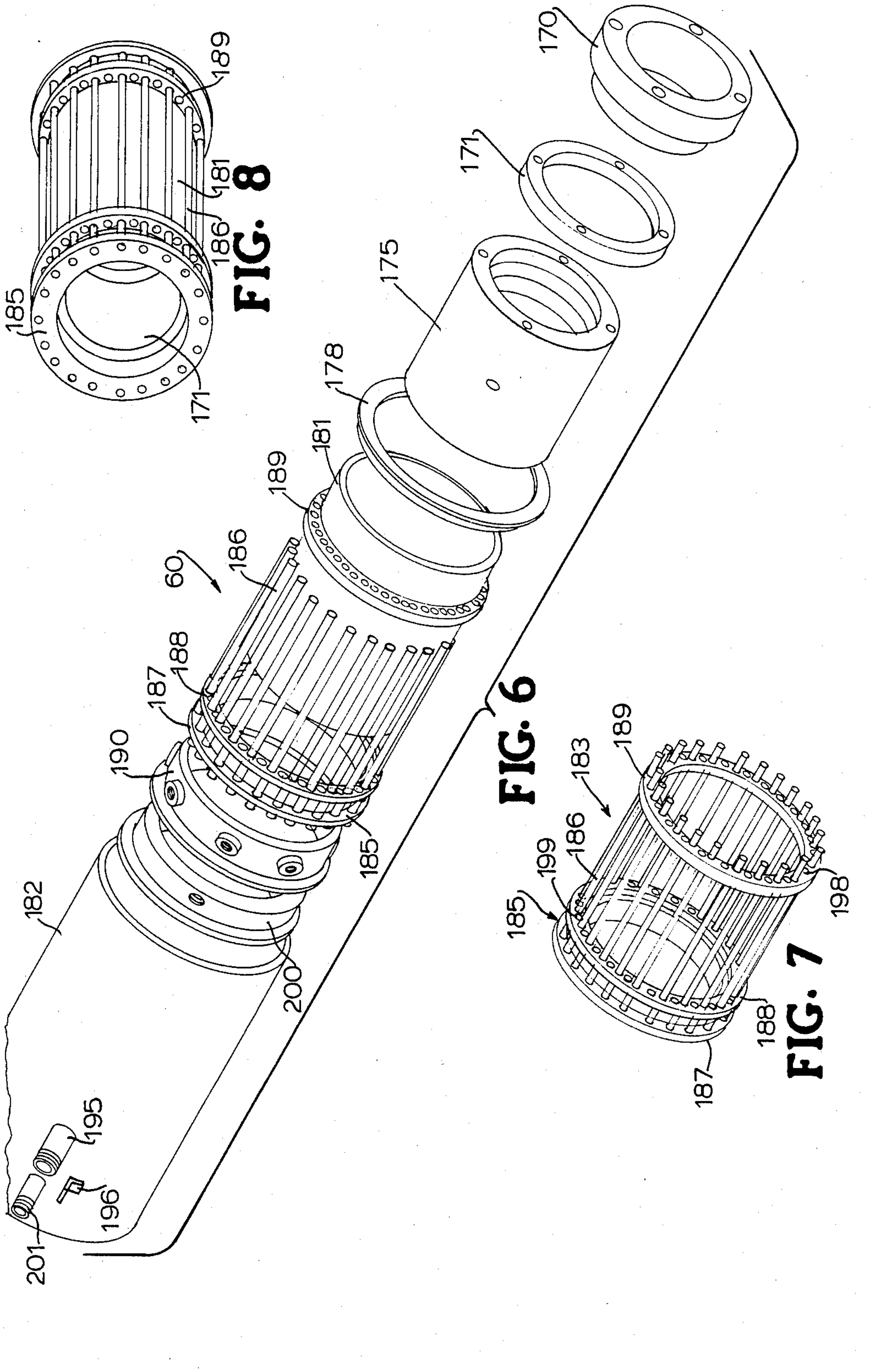
FIG. 6 is an exploded view of the outer subassembly for the plasma generator shown in FIG. 1.
FIG. 7 is a perspective view of a heat transfer subassembly forming part of the outer subassembly and associated with cooling the outermost shroud.
FIG. 8 is a perspective view of the heat transfer subassembly shown in FIG. 7 assembled with other components.
Figure 9:
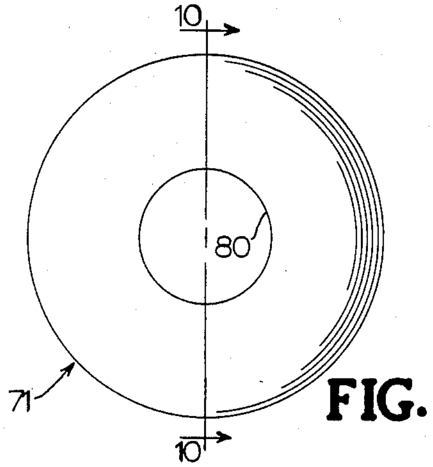
FIG. 9 is a front view of the collimator.
Figure 12:
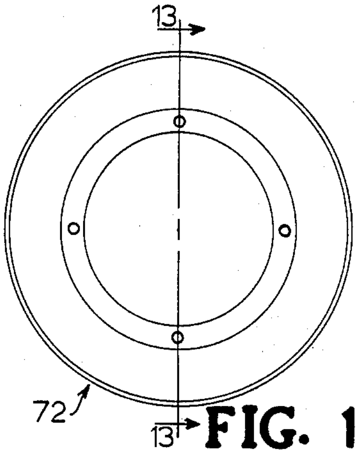
FIG. 12 is a front view of the collimator support collar and collimator water guide.
Figure 49:
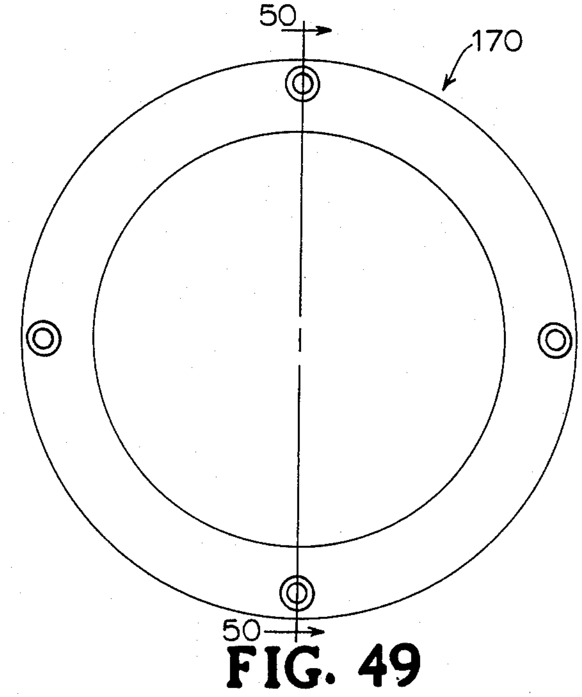
FIG. 49 is a front end view of the front insulator.
Figure 50:
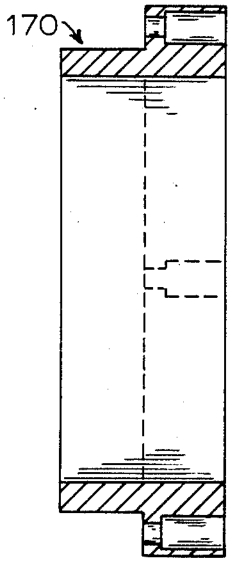
FIG. 50 is a section view taken along line 50—50 of FIG. 49.
Figure 52:
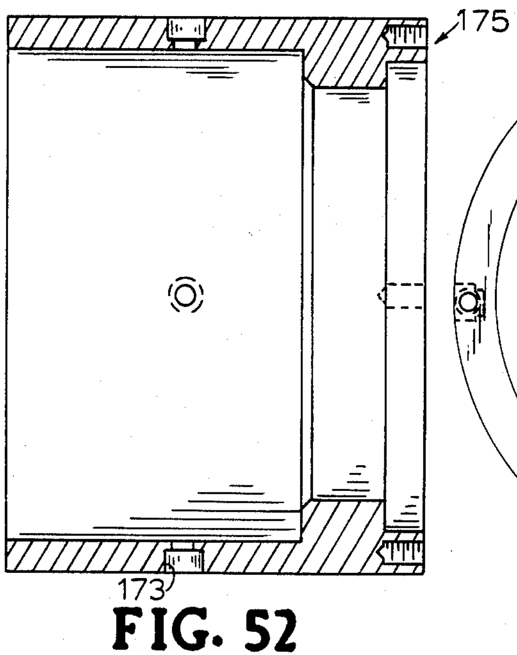
FIG. 52 is a section view taken along line 52—52 of FIG. 51.
Figure 51:
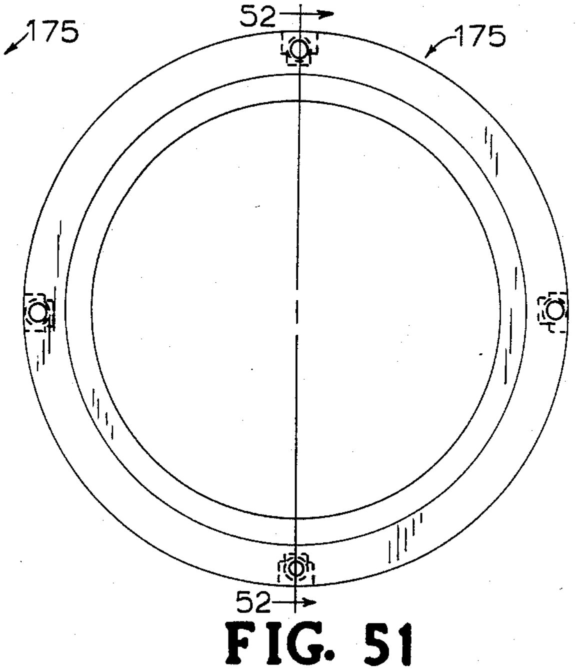
FIG. 51 is a front end view of the rear insulator.

The outer subassembly 60 illustrated in an exploded view in FIG. 6 includes a front insulator 170, shown in detail in FIGS. 49–50, which is made of a high temperature insulation material and partially mounts within and secures to a metal locking ring 171. Front insulator 170 also secures to a rear insulator 175, shown in detail in FIGS. 51–52, by means of bolts 176 seen in FIG. 1. Other bolts 172 (FIG. 1) pass through holes 173 (FIG.

Figure 54:
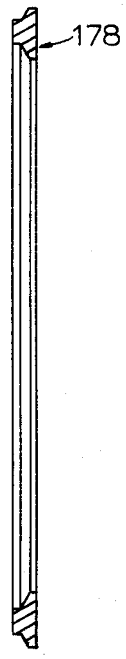
FIG. 54 is a section view taken along line 54—54 of FIG. 53.
Figure 53:
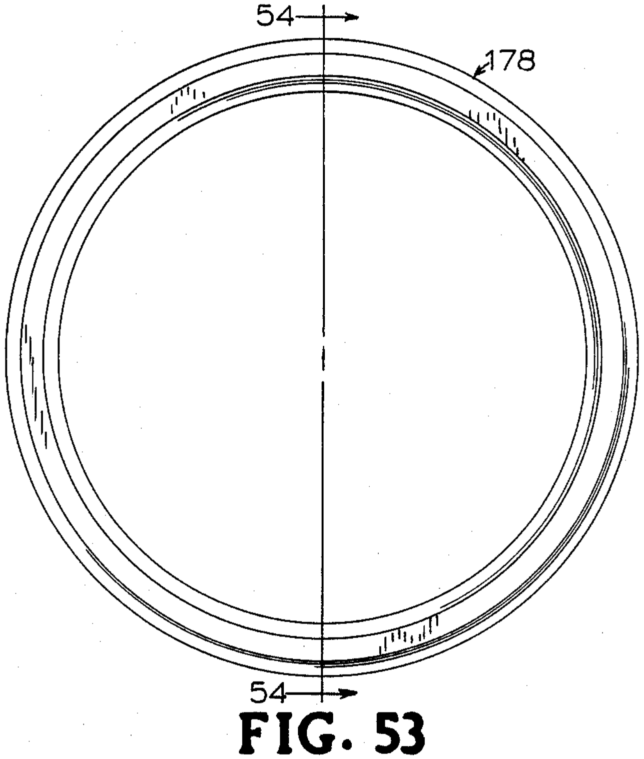
FIG. 53 is a rear end view of the outer shroud shoulder ring.

52) to add additional securement. Rear insulator 175 in turn abuts the metal and electrically-grounded shoulder ring 178, shown in detail in FIGS. 53 and 54. Shoulder ring 178 is welded as indicated at sites 179, 180 in FIG. 1 to the forward ends of an inner metal shroud member 181 and an outer metal shroud member 182. Between inner and outer shroud members 181, 182, there is installed the outer shroud cooling manifold-tube structure 183 shown as a subassembly in FIG. 7 and shown assembled with other components in FIG. 8.

Figure 55:
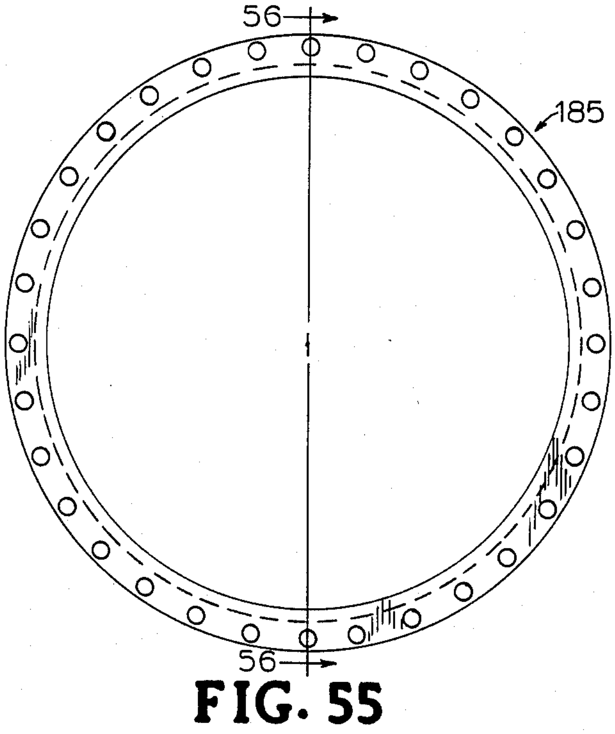
FIG. 55 is a rear end view of the rear output water manifold.
Figure 56:
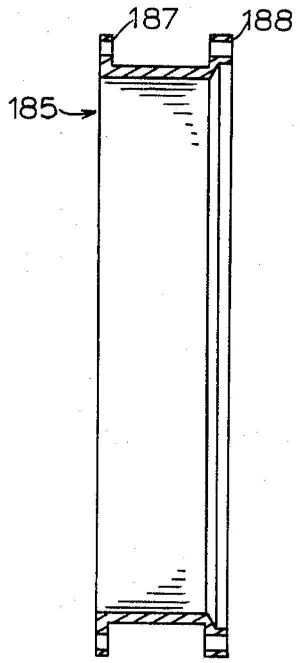
FIG. 56 is a section view taken along line 56—56 of FIG. 55.
Figure 57:
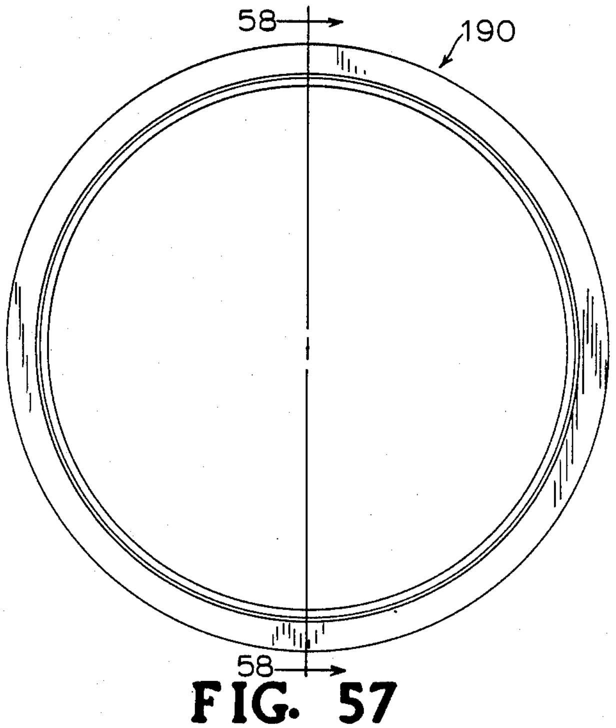
FIG. 57 is a rear end view of the rear input water manifold.
Figure 58:
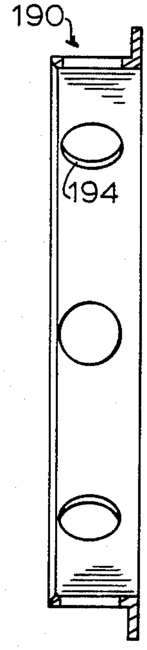
FIG. 58 is a section view taken along line 58—58 of FIG. 57.
Figure 60:
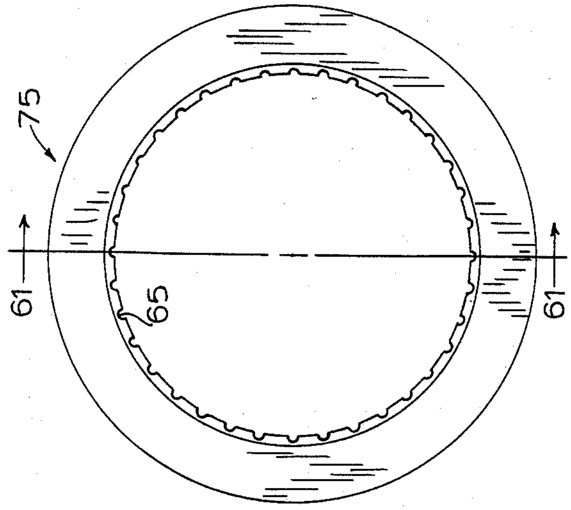
FIG. 60 is a front end view of the collecting water manifold.
Figure 61:
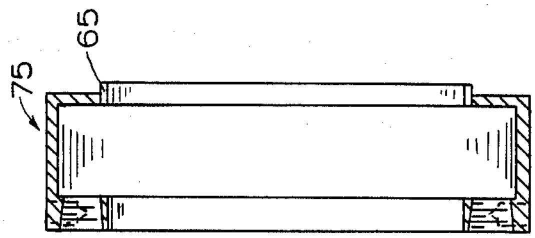
FIG. 61 is a section view taken along line 61—61 of FIG. 60.
Figure 59:
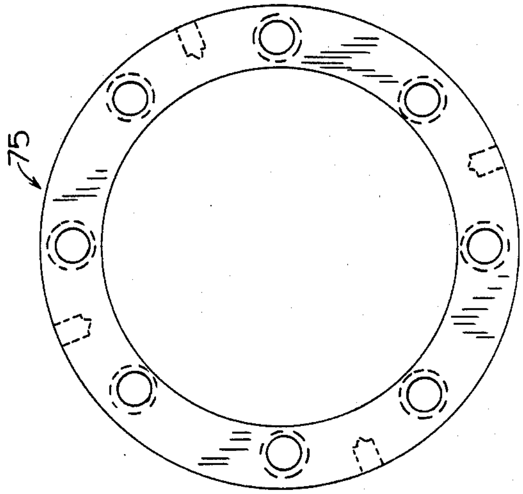
FIG. 59 is a rear end view of the collecting water manifold.

Manifold tube structure 183 is made up of the metal rear output water manifold 185, shown in FIGS. 55 and 56, a plurality of metal tubes 186 and a tube retaining ring 189. Tubes 186 extend through the flanges 187, 188 of the manifold 185 and through the retaining ring 189, as seen in FIG. 7, to establish appropriate structure for the later-described water flow path. Flow of the coolant fluid in tubes 186 is in the direction of the arrow in FIG. 6 and the water or other coolant fluid enters metal tubes 186 from the metal rear input water manifold 190, shown in detail in FIGS. 57–58, and thereafter flows back through the holes 198 (FIG. 7) in the retaining ring 189, around metal shroud 181 and within shroud 182, then through holes 199 in the rear output water manifold 185.

The coolant water is received by rear input water manifold 190 through pipe connections 191 and 192 (FIG. 1) at either end of looped electrically nonconducting pipes 193 (FIG. 1). The water passes through holes 194 (FIG. 58) in manifold 190. Pipes 193 are of predetermined length and looped so as to establish a predetermined electrical resistance in the insulated water path confined in such pipes and extending between the metal water collecting manifold 75, seen in FIG. 1 and in more detail in FIGS. 59–61 and the metal rear input water manifold 190. The water path leads to the collecting water manifold 75 from the previously described inner shroud assembly through passages 64 (FIG. 1) formed by the grooves 65 formed in manifold 75 as seen in FIG. 1. Here, it might be noted that metal manifold 75 is mechanically and thus electrically connected to the collimator assembly 70. The start cable 130, shown in FIGS. 1, 2, 68 and 70, is therefore in practice connected to the metal manifold 75 which establishes a starting circuit connection when required to the collimator assembly 70. The water collected in the rear ouput water manifold 185 is discharged through a single outlet pipe 195 mounted in the outermost shroud 182 which is electrically grounded by means of grounding lug 196. The water or other coolant fluid thus enters through a single inlet pipe 145 and discharges through a single outlet pipe 195, both of which are seen in FIG. 1. Outlet pipe 195 preferably connects through an electrically conducting pipe to the waste main.

Figure 34:
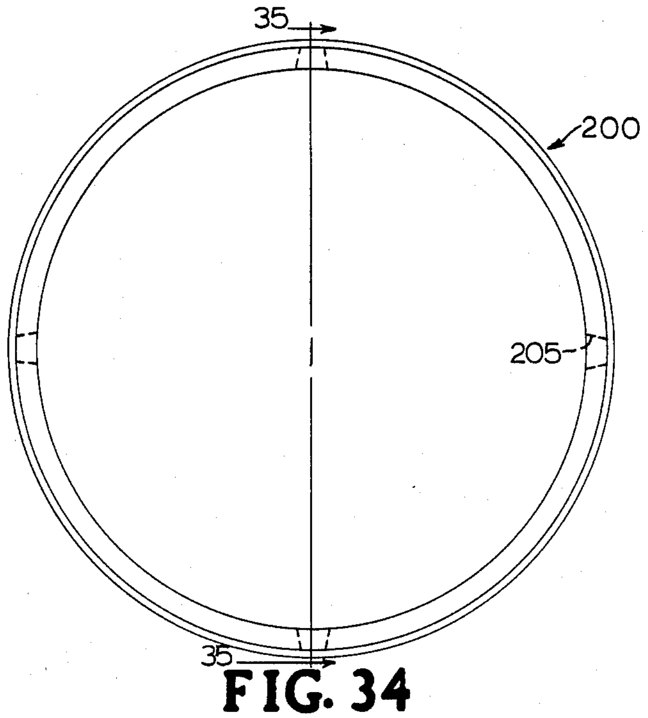
FIG. 34 is a rear view of the gas manifold.
Figure 35:
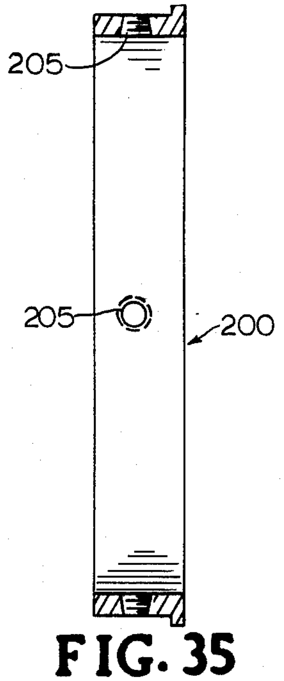
FIG. 35 is a section view taken along line 35—35 of FIG. 34.
Figure 29:
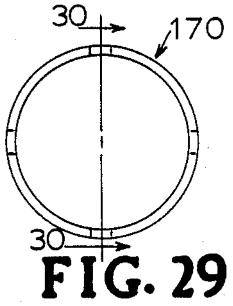
FIG. 29 is a rear view of the water guide.

To complete the description of those components of the outer subassembly 60 illustrated in FIG. 6 and with reference to the gas system, there is provided a gas input manifold 200 which is illustrated in detail in FIGS. 34–35. Gas input manifold 200 is mounted so as to receive the incoming pressurized gas through a gas input pipe 201, seen in FIG. 1. A plurality of gas transfer pipes 202 connect to manifold 200 through couplings 203 mounted in holes 205 to communicate the incoming pressurized gas to couplings 204, seen in FIG. 1. From couplings 204, the gas is passed through passages 121 and 122 in the collimator insulator 120, seen in detail in FIGS. 39–41 and also seen in FIG. 1. Passages 122 in turn communicate with the vortex generator 90, seen in detail in FIGS. 16–20 and also seen in FIGS. 1 and 3. The gas then enters the vortex chamber formed within the vortex generator 90 and surrounding the gap 95 between the collimator 71 and the rear electrode 100.

Figure 63:
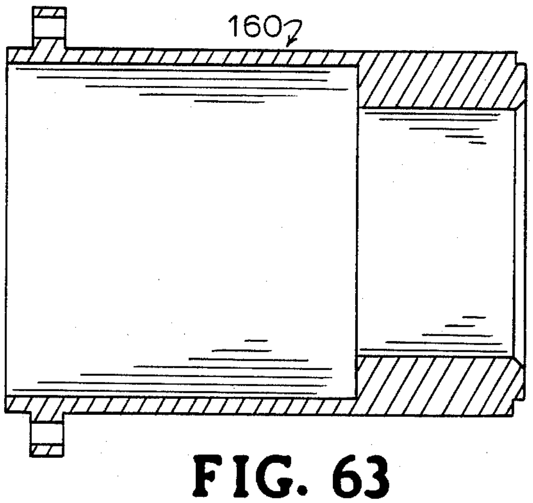
FIG. 63 is a section view taken along line 63—63 of FIG. 62.
Figure 62:
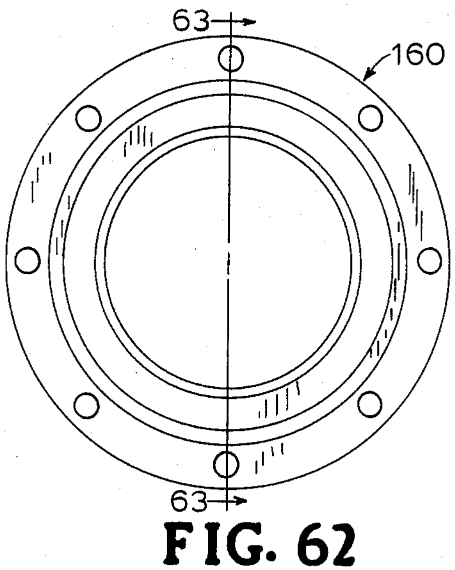
FIG. 62 is a front end view of the power cable insulator.
Figure 64:
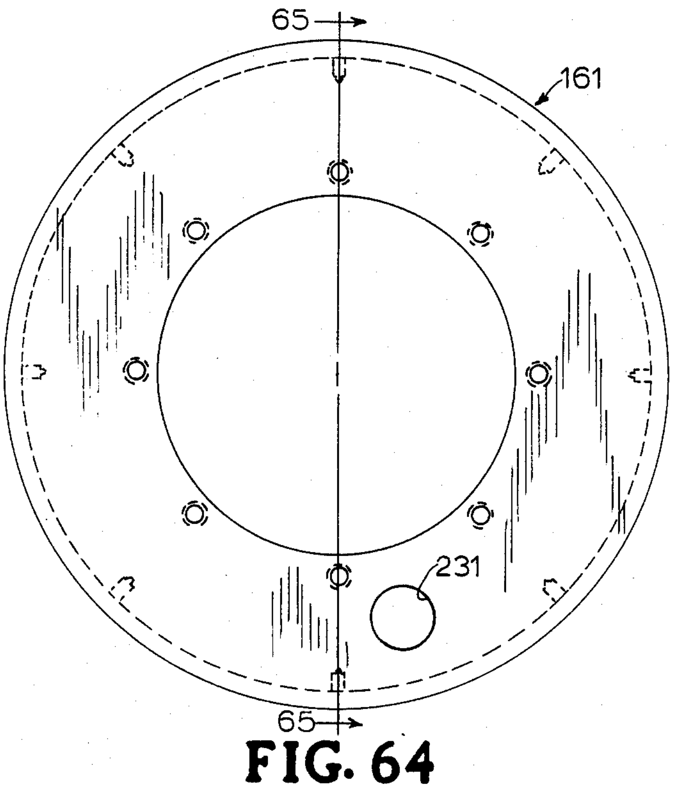
FIG. 64 is a rear end view of the rear cover plate.
Figure 65:
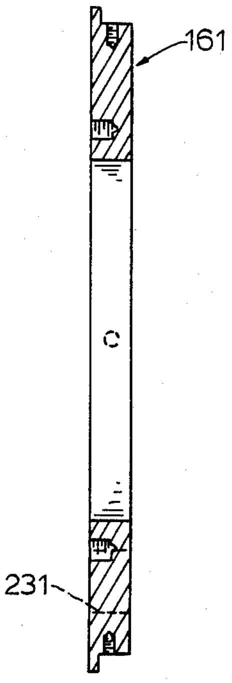
FIG. 65 is a section view taken along line 65—65 of FIG. 64.

Additional electrical insulation around the power cables 141 and electrode holder 140 is provided by means of the previously-mentioned power cable insulator 160, seen in FIG. 1 and in more detail in FIGS. 62–63. Rear cover plate 161, seen in FIG. 1 and in more detail in FIGS. 64–65, is secured to the outermost shroud 182 by means of bolts 225. Insulator 160 attaches to cover plate 161 by means of bolts 157 as also illustrated in FIG. 1. Power cables 141 and coolant inlet pipe 145 are effectively housed by insulator 160 and a start cable 230 (FIGS. 1 and 70) passes through a hole 231 provided in rear cover plate 161 and connects to the collecting water manifold 75 as previously mentioned and which is connected to collimator assembly 70. An appropriate pliable, high heat resistant and electrical insulator material 240 is inserted around shroud 89 as seen in FIG. 1.

As has been previously mentioned, the method and efficiency of cooling of a plasma generator and particularly of the components exposed to maximum heat flux is of critical importance. Rear electrode and collimator erosion, insulator integrity, reliability, undesired arc attachments, fluid consumption, and maintenance of fluid seals between component surfaces are some of the many practical aspects of plasma generation operation that are dramatically affected by the cooling system and its efficiency and how the system operates.

Figure 66:
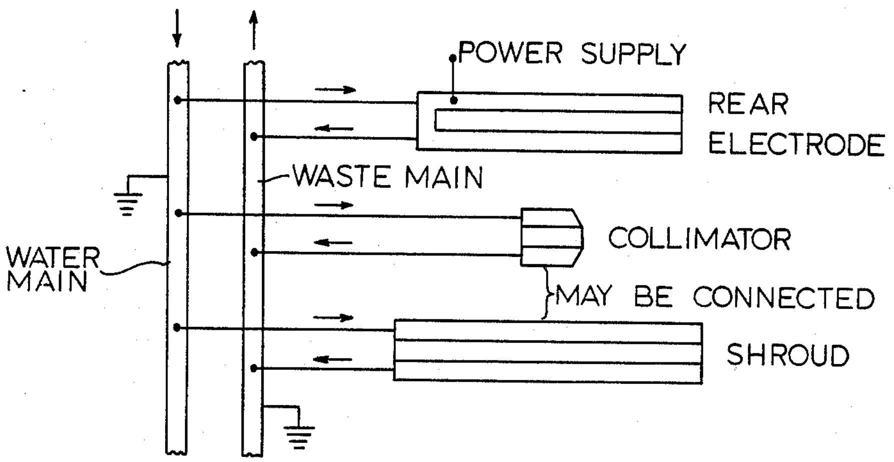
FIG. 66 (PRIOR ART)
FIG. 66 is a diagram of a prior art cooling system.

FIG. 66 represents a known and accepted prior art method and system for cooling a transferred arc torch using a collimator and single shroud in which the coolant fluid, typically water, is brought in from an electrically-grounded water supply main is then supplied to the rear electrode and is then returned to the electrically-grounded waste or sewer main. A second separate water path is established between the water main, the collimator and the sewer main. A third and separate water path is established between the water main, the shroud and the waste main. All the mentioned water flow paths are relatively long and therefore establish paths through the water of relatively high electrical resistance. The prior art cooling system depicted in FIG. 66 has the advantage of preventing the water or other coolant which comes in contact with the rear electrode also coming in contact with the collimator before it returns to the waste main and thus eliminates the risk of developing an electrical short-circuit path in the water path itself between the rear electrode and collimator or between the collimator and the shroud or between the shroud and ground when the shroud and collimator are connected. However, experience dictates that the parallel path system requires that the coolant be accelerated in all the cooling circuits thus creating large demands for the water or other coolant. The invention thus recognizes that substantial water savings could be realized by having a system such as provided by the invention in which the water paths are so designed both electrically and hydraulically so as to allow the water or other cooling fluid to flow in what can be referred to as a series path with controlled acceleration of the coolant in only predetermined portions of the path such as in the invention system illustrated in FIG. 67 rather than in parallel paths as illustrated in the prior art system of FIG. 66.

Figure 67:
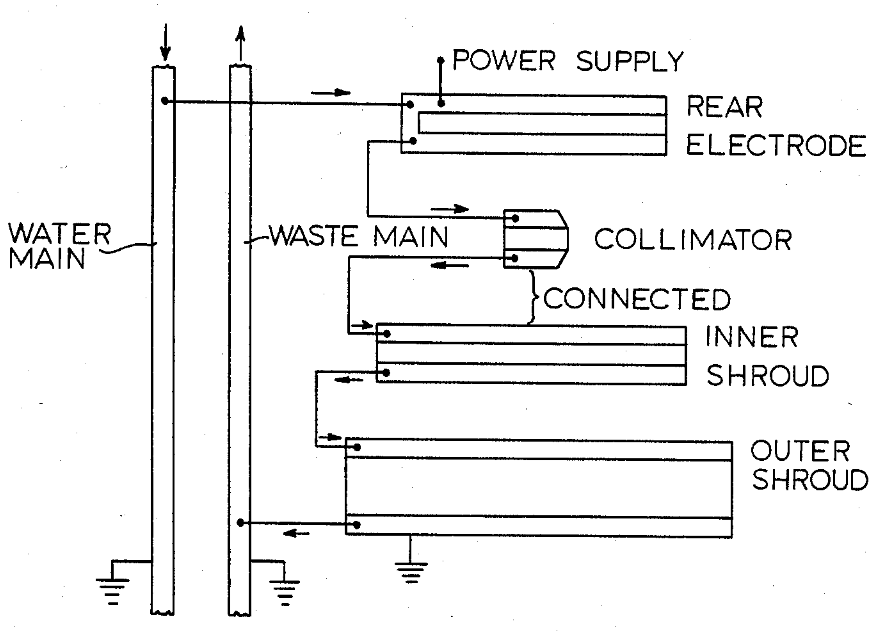
FIG. 67 is a diagram of the improved cooling system of the invention.
Figure 68:
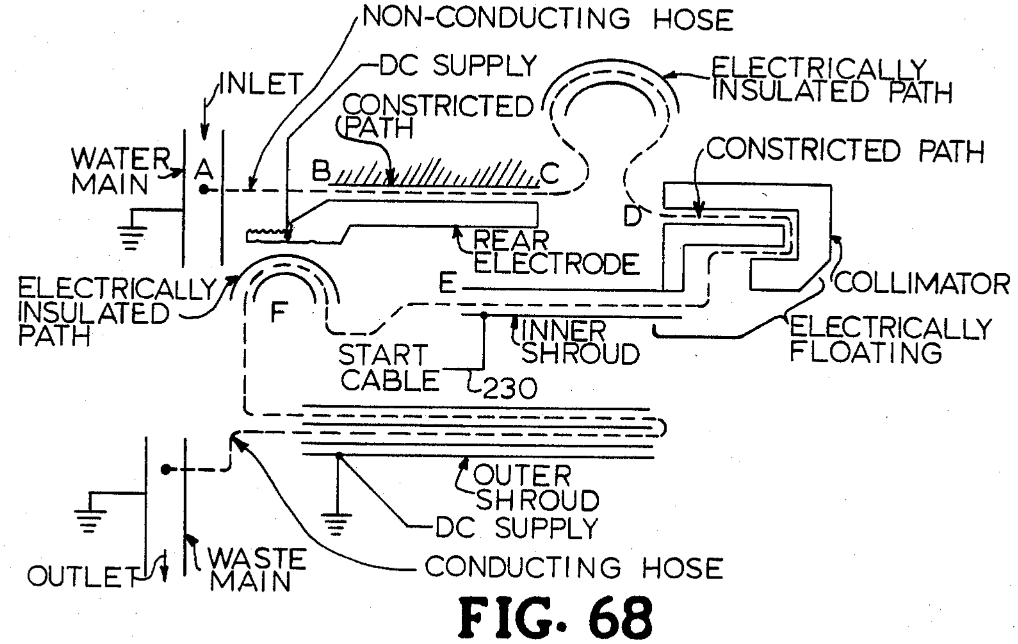
FIG. 68 is a schematic diagram of various electrical and hydraulic characteristics of the cooling system of the invention.

Making reference to FIGS. 1, 67 and 68, the actual water path through the plasma generator 50 of the invention is traced by a line of arrow shapes, designated "water path", in FIG. 1, is schematically illustrated in FIG. 67 and is further illustrated in FIG. 68 with regard to the electrical characteristics of the invention system which make the series-type flow path illustrated in FIG. 67 a practical possibility. Making reference initially to FIG. 67 and with water assumed to be the coolant, the water flow path of the invention is illustrated by the water being drawn from the water main initially, transferred to the rear electrode of the invention, then to the collimator of the invention, from the collimator to the inner shroud, from the inner shroud to the outer shroud, and from the outer shroud back to the electrically-grounded water main. .In the cooling water system of FIG. 67, which exemplifies the system of the invention, it will be appreciated that the same water which is used to cool the rear electrode is also used to cool the collimator, the inner shroud, and the outer shroud before it is returned to the electrically-grounded, waste-sewer main. Thus, very substantial savings in cooling fluid consumption will be immediately apparent to those skilled in the art in comparison to the fluid consumption associated with a parallel system as illustrated in FIG. 66. The actual path of the water is indicated by the line of arrow shapes in FIG. 1. In this arrow shape line path, it will be noted that the water enters through inlet 145, passes through and thus cools the power-carrying, rear electrode holder 140, is then accelerated between the water guide 170 and the electrode 100, is then guided through the front cup 110, through the passages in the collimator assembly 70, then through the front ring 79 and inner shroud established by shroud members 87 and 89 to the collector manifold 75, then through the loops of electrically nonconducting hoses 193 to the rear input water manifold 190, then through tubes 186, then back to the output water manifold 185 to be discharged through the outlet pipe 195 and then to the main waste through pipe formed of electrically conducting material. Thus, it can be seen from the schematic diagram of FIG. 67 and the actual trace of the water path as just described in reference to FIG. 1 that a series-type water-cooling system and method of cooling has been achieved even though the same water which cools the electrode is also used to cool the collimator as well as both a metal inner shroud and a metal outer shroud. How this is accomplished is next described in reference to FIG. 68 which again represents the water system schematically but with emphasis to the unique hydraulic and electrical characteristics of the invention cooling system.

In reference to FIGS. 1 and 68, reference letters A, B, C, D, E, F and G have been placed on both FIG. 1 and FIG. 68 to illustrate the comparison between the schematic drawing of FIG. 68 and the actual construction embodied in FIG. 1. Thus, making reference to FIGS. 1 and 68, it will be noted that the cooling fluid, assumed to be pressurized water of drinking quality, is brought in from the water main source designated A and is transferred from the water main A through a nonconducting water hose, i.e., hose 145, to location B. In moving from location B to location C in the referenced drawings, it will be noted that the cooling fluid, i.e., the water, will have been forced through a constricted path bounded by metal and immediately adjacent to the outer surface of the rear electrode, as formed by the water guide 170. Thus, between location B and location C, the cooling water is effectively in direct physical contact with metal at the voltage of the rear electrode 100. However, in moving through the purposely relatively unrestricted and relatively long insulated path passing through the front cup 110 and the collimator insulator 120, i.e., between points C and D, the water is forced through a path of predetermined length and predetermined electrical resistance before the water again comes in contact with the collimator metal at location D. The size and length of the water path between locations C and D is thus determined so as to establish a relatively high electrical resistance and thereby minimize any tendency for an electrical short-circuit to be established between locations C and D. Furthermore, it will be noted that the water path between locations C and D is substantially electrically insulated from the rear electrode 100 which further limits any tendency for an undesirable short circuit condition between locations C and D. From location D, the coolant fluid is indicated as passing through the collimator assembly 70 to the inner shroud made up of the front ring 79, inner shroud 87 and outer shroud 79. Thus, between locations D and E, as illustrated in the actual structure in FIG. 1 and schematically in FIG. 68, it will be noted that the water is maintained in physical contact with metal and since the collimator assembly 70 and the inner shroud made up of the mentioned components is in an electrically floating state, the water in the passages between location D and E is also in effect dominated by an electrically floating state. Between locations E and F, the water is caused to pass through a loop of electrically nonconducting pipe 193 of predetermined length and internal size so as to again establish a predetermined hydraulic and electrical resistance between locations E and F within the cooling system. From location F the fluid is passed through the metal outer shroud assembly (FIG. 7), through the metal output water manifold 185 and to the water outlet pipe 195 at location G. Between locations F and G, it will again be noted that the water is essentially in contact with metal and since the outer shroud is electrically grounded by means of the grounding lug 196, shown in FIG. 2, this also means that the water path between locations F and G is also effectively at an electrically-grounded condition. From location G, the heated water is then returned to the waste main through electrically conducting hose or alternatively to a cooling mechanism for cooling the water prior to reuse in the cooling system. Thus, it can be seen that a substantial reduction in water consumption can be realized by utilizing a series water path and a path in which there is relatively high electrical resistance between locations A and B, locations C and D, and locations E and F, and a relatively high water velocity between locations B and C and between locations D and E. These unique aspects of the invention cooling system and method thus provide a dramatically overall improved plasma generator operation.

Figure 69:
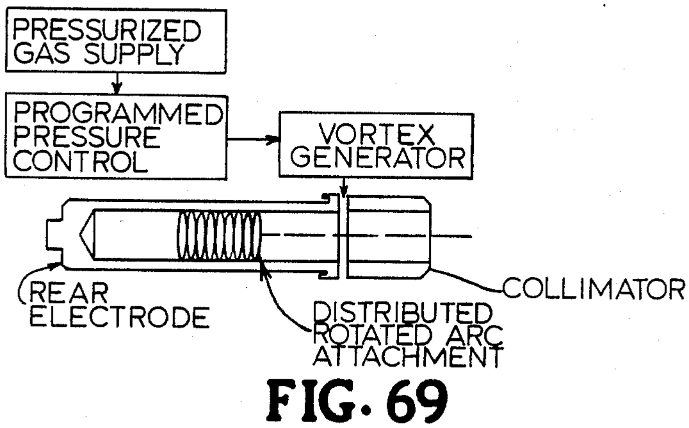
FIG. 69 is a diagram illustrating an improved system and method associated with the plasma generator of the invention for distributing the arc attachment.

In another aspect of the invention, recognition is given to the fact that melting of the rear electrode material is always encountered and if the arc is rotated and attached continuously to a single line within the rear electrode, such line is excessively melted and eroded and thus leads to a need for early replacement of the rear electrode and relatively short operating life. Reference has also been made to use of an AC source as a means of inducing some rotation to the arc attachment to distribute the wear due to melting. While it has been known that the gas pressure in the gap 95 should be maintained so as to produce a gas velocity of at least 0.25 Mach, it has also been known that with this minimum pressure being continuously maintained, a variation in pressure tends to cause the arc attachment position to change. Thus, some operators of plasma generators, as previously mentioned, have installed a manual pressure valve and such operators have periodically manually regulated the valve in order to change the arc attachment position. What the present invention recognizes, as illustrated schematically in FIG. 69, is that operation of the plasma generator 50 of the invention can be even further improved by utilizing a programmed type pressure control between the pressurized gas supply and the vortex generator instead of a manual valve. Programmed pressure controls are well known as such and have been used for a variety of applications. Thus by using a programmed pressure control, the gas pressure can be maintained above the minimum amount required to maintain the gas velocity at or above 0.25 Mach and can also be programmed to induce a predetermined helical, back and forth movement within the rear electrode 100 and thereby continuously distribute the wear within the rear electrode and thus continuously distribute the degree of erosion over the entire usable surface to which the arc is attached rather than confining the erosion to a specific point or specific line of attachment. The programmed pressure control system illustrated in FIG. 69 thus makes it possible to obtain distributed arc attachment in the improved plasma generator 50 of the invention utilizing a DC source as the operating source of power. This is particularly advantageous with the present invention because of being able to shift points of required heat transfer in the high velocity coolant flow region surrounding the rear electrode 100 as defined by the water guide 170. Thus, the improved plasma generator 50 of the invention takes special advantage of this programmed gas pressure system for shifting the arc attachment.

The program regulating the pressure as described above should (a) always maintain the pressure sufficient to maintain a vortex generator velocity of at least 0.25 Mach; (b) regulate the pressure within a pressure band designed to maintain the arc attachment within the most desirable axial length AT; and (c) regulate the pressure so as to cause the arc to rotate in a somewhat helical, back and forth movement within the axial length AT so as to substantially erode the internal surface within such axial length AT at a substantially even rate over all portions thereof.

Another FIG. 70 illustrates how the plasma generator of the invention is started and how the plasma generation is maintained after the starting operation is consummated. In FIG. 70, the schematically-illustrated, rear electrode and collimator are shown connected to a DC power supply 250 in parallel with a storage capacitor 251 and in series with a ballast resistor 252, switch S-2 and the secondary winding 255 of a step-up transformer 256 and with a switch S-1 arranged to bypass the secondary winding 255. The primary winding 258 is connected to a pulse source 260 through a third switch S-3. In starting, main power is first applied with switch S-1 open and switch S-2 closed which establishes a circuit to the DC power supply 250 through start cable 230 and ballast resistor 252 to produce a voltage across the electrode-collimator gap 95 through the bypass capacitor 251. Next switch S-3 is closed so as to establish 10 to 15 joules of plasma energy across the electrode-collimator gap 95 to initiate the arc. Next, switch S-1 is closed to bypass the secondary winding 255. Finally, switch S-2 is opened to remove start cable 230 and ballast resistor 252 from the circuit and the plasma generator will now be operating in its normal mode for transferred arc operation.

As has also been referred to, it is sometimes desirable to be able to initiate melting of a material in a furnace with a nontransferred arc because of the nonelectrically conducting character of the material. However, once such material has melted in a selected zone, the invention recognizes that it is then often possible to attach a transferred plasma arc through the molten material to an electrically-grounded floor furnace, e.g., graphite, so as to maintain the melting process with a transferred arc heating source. In the plasma generator 50 of the invention, it is readily easy to unscrew and remove the collimator assembly 70 and the rear electrode 100 by utilizing an internal pipe wrench. Thus, these two major components which are most subject to thermal and electrical arc erosion wear are readily replaceable when required. Taking advantage of this aspect of the construction embodied in the plasma generator of the invention, the invention also provides another assembly which can be used in place of the collimator assembly 70 for service as a combined collimator/electrode enabling both nontransferred arc and transferred arc operation for applications with melting of nonconducting materials as heretofore referred to. FIGS. 71–77 illustrate this alternative collimator/electrode assembly and the construction of the components making up this assembly. These same figures also illustrate another feature directed to use of a type of front electrode having a cup-shaped bore at the discharge end of the front electrode with a bore of substantially less diameter on the same axis and for the remaining length of the electrode structure.

Figure 71:
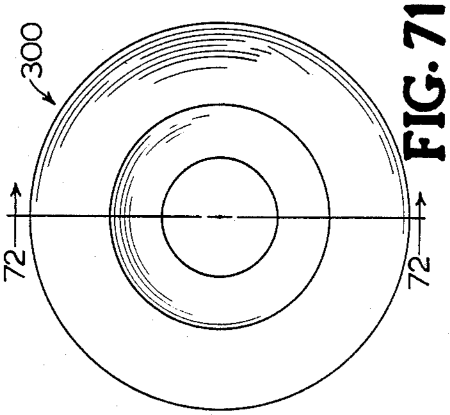
FIG. 71 is a front end view of an alternative collimator/electrode operable as either a front electrode or collimator and interchangeable with the collimator assembly shown in FIG. 15.
Figure 72:
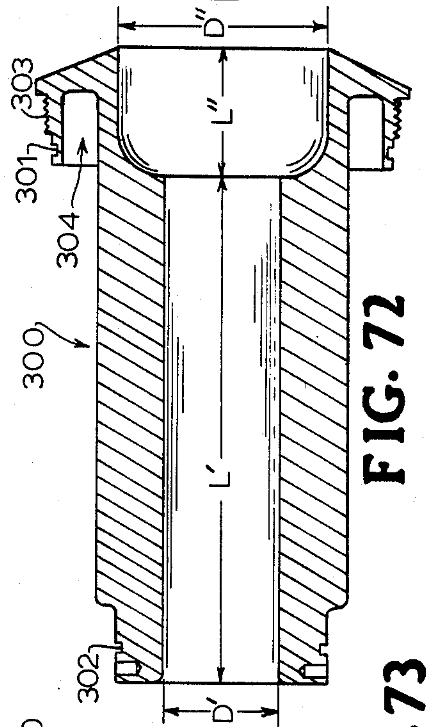
FIG. 72 is a section view of the collimator/electrode taken along line 72—72 of FIG. 71.
Figure 73:
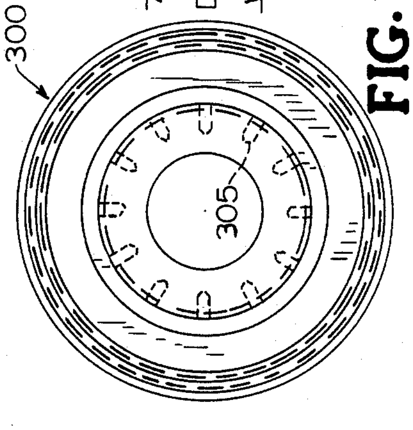
FIG. 73 is a rear end view of the collimator/electrode shown in FIG. 72.
Figure 74:
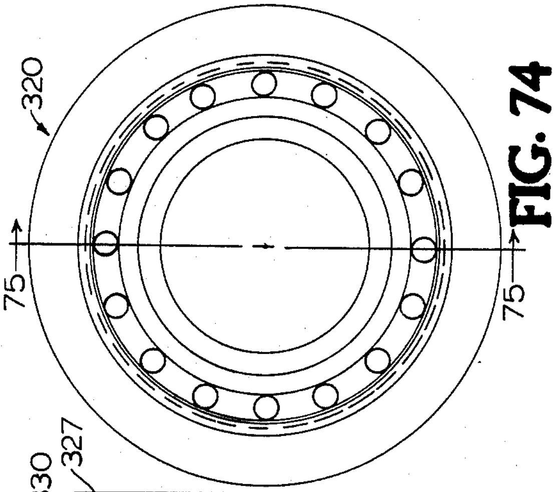
FIG. 74 is a front end view of the collimator/electrode support collar associated with the alternative collimator/electrode assembly shown in FIG. 77.
Figure 77:
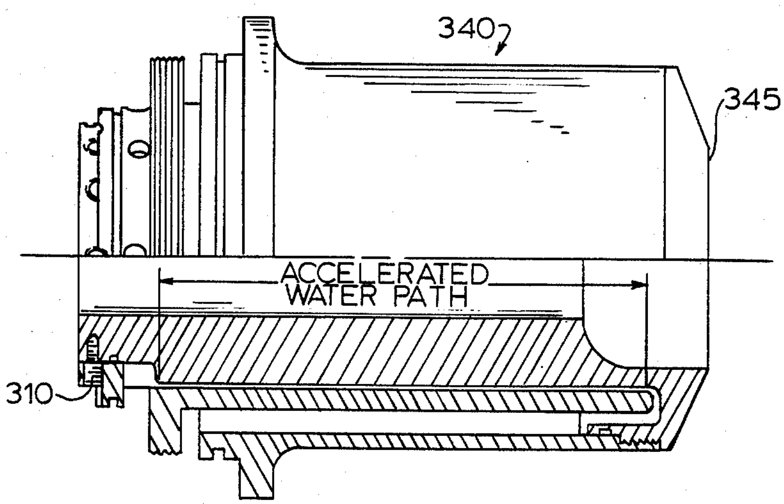
FIG. 77 is a section view illustrating the assembly of the collimator/electrode shown in FIG. 72 with the collimator/electrode support collar shown in FIG. 75.

FIGS. 71–73 illustrate the alternative collimator/electrode 300 having an inner bore of diameter D′ and length L′ associated with a communicating frontal cup-shaped bore having a diameter D″ and length L″. The collimator/electrode 300 receives O-rings in seats 301, 301 and is provided with a threaded coupling 303 surrounding an annular slot 304. A plurality of holes 305 are formed as indicated in FIG. 73 and which are utilized for receiving securing set screws 310 as seen in FIG. 77.

Figure 75:
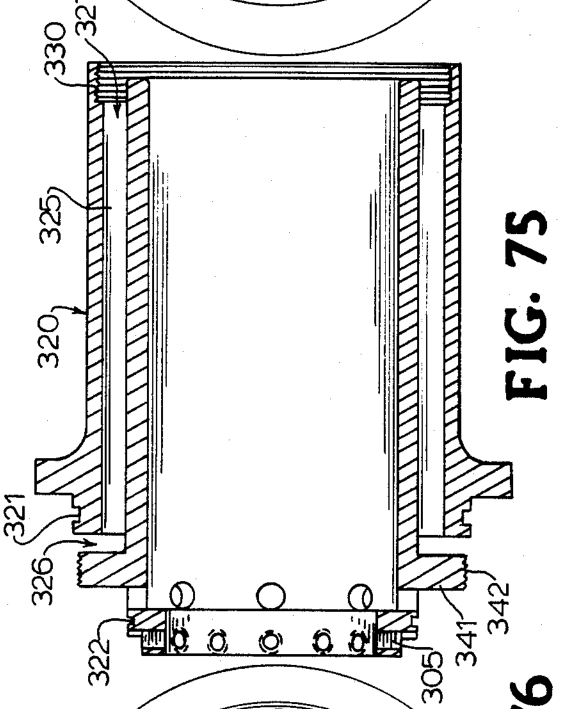
FIG. 75 is a section view taken along line 75—75 of FIG. 74.
Figure 76:
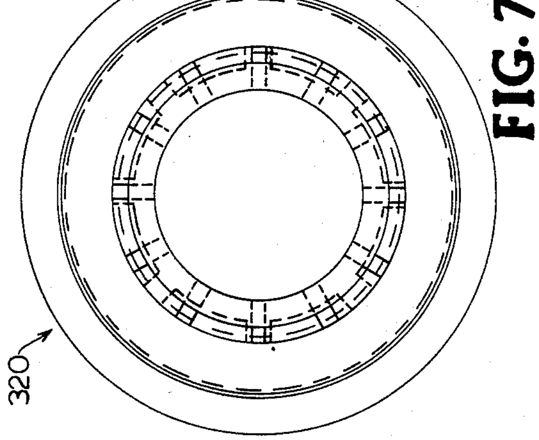
FIG. 76 is a rear end view of the electrode/collimator support collar.

Surrounding the collimator/electrode component 300 is the electrode shroud 320 shown in FIG. 75 and equipped for receiving O-rings in seats 321, 322. Cooling passages 325 run lengthwise with entrances 326 and exits 327. An internally threaded portion 330 is adapted to receive the threaded portion 303 of the collimator/electrode 300 seen in FIG. 72 to produce the collimator/electrode assembly 340 illustrated in FIG. 77. In use, the flange 341 is threadably secured by the threaded portion 342 to support the collimator/electrode assembly 340 in front ring 79 in the same manner in which the threaded flange 76 with threads 77, seen in FIG. 13, are utilized to support the collimator assembly 70 of FIG. 15 in front ring 79.

In use, the transferred or nontransferred mode of operating the collimator/electrode assembly 340 is determined by whether an electrical ground is reasonably close to the front surface 345 of the collimator/electrode assembly 340. Thus, if the electrical ground is extremely close, a transferred arc will be established. However, the arc will revert to a nontransferred mode if the arc is lengthened a substantial distance. Exactly how this hybrid-type plasma generator will operate will depend primarily on the ratio of the dimension L′ to the dimension D′ shown in FIG. 72. If L′/D′ is less than 4, the plasma generator utilizing the collimator/electrode assembly 340 of FIG. 77 will tend to transfer and thus operate in a transferred mode. However, if this ratio L′/D′ is greater than 4, the arc can only transfer if the electrical ground is brought extremely close to the front surface 345 (FIG. 77) and will revert to a nontransferred mode if the arc is lengthened to any extent as, for example, from one to two inches. Alternatively, if this ratio L′/D′ is substantially equal to 4, the arc will tend to transfer if the electrical ground is brought within approximately three inches of the surface 345 (FIG. 77) and the arc in this instance can be lengthened to approximately six inches before it reverts to the nontransferred mode.

A significant advantage of the invention resides in the fact that whether the collimator assembly 70 (FIG. 15) or collimator/electrode assembly 340 (FIG. 77) is being employed, the insulator adjustment mechanism 130 (FIG. 1) can be employed with either assembly. Thus, whenever the gap 95 (FIG. 1) tends to widen due to insulation distortion, creep or otherwise, the adjustment mechanism can be used to narrow the gap 95 to its precise requirement, width W, and also to prevent a leak developing particularly with the O-ring mounted in seat 86 (FIG. 13). In this regard, it should be observed that even though the distance moved is extremely small, the entire mechanism housed within insulator 160 (FIG. 1) actually moves within the generator 50 relative to this fixed structure. Thus, rear insulator 105 has a limited sliding relation with respect to insulator 160, both of which are seen in FIG. 1. Also, whether assembly 70 or assembly 340 is employed, the gas and coolant flows are substantially the same. In this regard, a final unique characteristic that is observed is the fact that the annular gas manifold established around the vortex generator is effectively concentric with and confined within the insulated water path connecting the rear electrode and the front assembly, whether it is assembly 70 or assembly 340.

The previously-described method of distributing electrode erosion is also adapted to use with assembly 70 or assembly 340. With either assembly, a preferred method of determining the gas flow requirement is now described. After determining the gas flow requirement for the generator, the vortex generator orifices are sized to provide the designed flow rate at a certain pressure, e.g., 60–80 psig. At the design pressure, the arc attachment point will be approximately in the middle of the usable surface area of the electrode 100. Changing the pressure ±5 psig (for a pressure spread of 10 psig), the arc attachment point can be moved forward towards the collimator and rearwards towards the electrode holder. The pressure change is calculated to move the attachment point within the limits of good electrode design. The rearward attachment point should preferably be no further than about two diameters from the rear surface of the electrode cavity and no further than about two diameters from the O-ring at the front of the electrode. The attachment point is then positioned by program control of the gas pressure change as schematically illustrated in FIG. 69.

In summary, it can be seen that the invention has thus provided a substantially overall improved plasma generator construction, a substantially improved cooling system and method of cooling, an improved double, fluid-cooled shroud system, the ability to operate with substantially improved control over erosion than has heretofore been obtainable operating on a DC source and finally the ability to operate with an alternative collimator/electrode assembly adapted to operate in either the transferred or nontransferred mode of operation.

What is claimed is:

1. A plasma arc torch comprising a rear electrode comprising a tubular metal member having a closed inner end and an open outer end, a front electrode comprising a tubular metal member having a bore therethrough, said front electrode being mounted in coaxial alignment with and electrically insulated from said rear electrode and having an inner end adjacent said open outer end of said rear electrode and an opposite outer end, vortex generating means including a vortex forming chamber disposed intermediate and in coaxial alignment with said rear and front electrodes for generating a vortical flow of a gas between said rear and front electrodes, an inner annular metal shroud mounted to concentrically surround at least an axial portion of each of said rear and front electrodes, with said inner shroud being connected to said front electrode in electrically conductive relationship, first insulation means mounted to electrically insulate said inner shroud and said front electrode from said rear electrode, an outer annular metal shroud mounted to concentrically surround at least an axial portion of said rear electrode, second insulation means mounted to electrically insulate said outer shroud from each of said rear and front electrodes and said inner shroud, power supply means operatively connected to said rear electrode and said outer shroud for generating an arc which is adapted to extend axially from said rear electrode through said vortical flow of gas and through at least a portion of the axial length of said bore of said first electrode, and coolant flow path means extending so as to be in serial heat exchange relationship with each of said rear electrode, said front electrode, said inner shroud, and said outer shroud, and such that a fluid coolant may be circulated through said coolant flow path means to remove heat from said torch during operation thereof, said coolant flow path means including a first segment which extends through said first insulation means and between said rear and front electrodes, and a second segment which extends through said second insulation means and between said inner and outer shrouds, said first and second segments each having a length such that said first and second insulation means each provide a predetermined electrical resistance in the portions of the coolant flow path means extending therethrough to effectively avoid short circuiting through the coolant.

2. The plasma arc torch as defined in claim 1 wherein said second insulation means includes an electrically nonconducting pipe, and said second segment of said coolant flow path means extends through said pipe.

3. The plasma arc torch as defined in claim 1 wherein said coolant flow path means extends serially from said rear electrode through said first insulation means to said front electrode, then to said inner shroud, and then through said second insulation means to said outer shroud.

4. A plasma arc torch comprising a rear electrode comprising a tubular metal member having a closed inner end and an open outer end, a front electrode comprising a tubular metal member having a bore therethrough, said front electrode being mounted in coaxial alignment with and electrically insulated from said rear electrode and having an inner end adjacent said open outer end of said rear electrode and an opposite outer end, vortex generating means including a vortex forming chamber disposed intermediate and in coaxial alignment with said rear and front electrodes for generating a vortical flow of a gas between said rear and front electrodes, an inner annular shroud mounted to concentrically surround at least an axial portion of each of said rear and front electrodes, first insulation means mounted to electrically insulate said inner shroud and said front electrode from said rear electrode, an outer annular shroud mounted to concentrically surround at least an axial portion of said rear electrode and said inner shroud, second insulation means mounted to electrically insulate said outer shroud from each of said rear and front electrodes and said inner shroud, power supply means for generating an arc which is adapted to extend axially from said rear electrode through said vortical flow of gas and through at least a portion of the axial length of said bore of said front electrode, coolant flow path means extending serially so as to be in heat exchange relationship with each of said rear electrode, said front electrode, said inner shroud, and said outer shroud, and such that a fluid coolant may be introduced into one end of said coolant flow path means and withdrawn from the other end, to remove heat from said torch during operation thereof, said coolant flow path means including a first segment which extends through said first insulation means and between said rear and front electrodes, and a second segment which extends through said second insulation means and between said inner and outer shrouds, said first and second segments each having a length such that said first and second insulation means each provide a predetermined electrical resistance in the portions of the coolant flow path means extending therethrough to effectively avoid short circuiting through the coolant.

5. The plasma arc torch as defined in claim 4 wherein said coolant flow path means extends serially from said rear electrode, through said first insulation means to said front electrode, to said inner shroud, and through said second insulation means to said outer shroud.

6. The plasma torch as defined in claim 4 wherein said first insulation means comprises a tubular insulator surrounding substantially the entire length of said rear electrode, and wherein said vortex generating means includes a flow path extending through said tubular insulator and to said vortex forming chamber.

7. The plasma arc torch as defined in claim 4 wherein said outer shroud comprises a pair of radially spaced apart tubular members, and a plurality of tubes extending axially therebetween, with said tubes forming a portion of said coolant flow path means and such that the coolant is adapted to flow in one direction through the inside of said tubes and in the opposite direction along the outside of said tubes.

8. The plasma arc torch as defined in claim 5 wherein said inner shroud is composed of metal and is connected to said front electrode in electrically conductive relationship.

9. The plasma arc torch as defined in claim 8 wherein said power supply means is operatively connected to said rear electrode and said outer shroud, and such that said front electrode and said inner shroud are in electrically floating relationship.

10. The plasma arc torch as defined in claim 9 wherein said coolant flow path means includes a first portion in direct contact with a substantial portion of the axial length of said rear electrode, and a second portion in direct contact with a substantial portion of the axial length of said front electrode.

11. The plasma arc torch as defined in claim 10 wherein said first and second portions of said coolant flow path means are constricted so as to establish a relatively high coolant velocity therethrough relative to the coolant velocity in other portions of said coolant flow path means.

12. The plasma arc torch as defined in claim 5 wherein said outer shroud is mounted to surround only the rearward portion of said inner shroud, and such that the forward portion of said inner assembly is exposed.

13. The plasma arc torch as defined in claim 4 wherein said vortex generating means further comprises programmed control means for varying the pressure of the gas in said vortex forming chamber according to a predetermined program and so as to distribute the arc attachment point within said rear electrode and thereby distribute erosion thereof.

14. The plasma arc torch as defined in claim 5 wherein said bore of said front electrode includes an outer end portion which is cup-shaped in cross section to define an outwardly facing radial shoulder, and such that the arc generated by said power supply means is adapted to attach at a point located on said radial shoulder.

15. The plasma arc torch as defined in claim 5 wherein said inner annular shroud and said outer annular shroud each comprise a relatively thin walled tubular member, and said coolant flow path includes an annulus which extends coaxially within the wall of each of said tubular members and along substantially the entire axial length thereof.

* * * * *